United States Patent [19]

Miyachi

[11] Patent Number: 4,532,692
[45] Date of Patent: Aug. 6, 1985

[54] CHUCK JAW CHANGER FOR A MACHINE TOOL

[75] Inventor: Chihiro Miyachi, Nagoya, Japan

[73] Assignee: Howa Kogyo Kabushiki Kaisha, Nagoya, Japan

[21] Appl. No.: 542,196

[22] Filed: Oct. 14, 1983

[30] Foreign Application Priority Data

| Oct. 19, 1982 [JP] | Japan | 57-183881 |
| Mar. 28, 1983 [JP] | Japan | 58-52228 |
| Apr. 25, 1983 [JP] | Japan | 58-73491 |
| Apr. 25, 1983 [JP] | Japan | 58-73492 |
| May 24, 1983 [JP] | Japan | 58-92084 |

[51] Int. Cl.³ .................................. B23Q 3/157
[52] U.S. Cl. .................................... 29/568
[58] Field of Search ............. 29/568, 26 A; 279/1 TS, 279/1 R; 82/2.5

[56] References Cited

U.S. PATENT DOCUMENTS

| 4,100,671 | 7/1978 | Junike | 29/568 |
| 4,313,252 | 2/1982 | Kuska | 29/568 |

FOREIGN PATENT DOCUMENTS

| 2610587 | 9/1977 | Fed. Rep. of Germany | 29/568 |
| 5273 | 1/1980 | Japan | 29/568 |

Primary Examiner—William R. Briggs
Attorney, Agent, or Firm—Wenderoth, Lind & Ponack

[57] ABSTRACT

A chuck jaw changer is provided for a machine tool such as a numerically controlled lathe (22) for automatically changing the gripping jaws (32) of a quick change chuck (28) on its work spindle (26). The set of gripping jaws of the chuck are replaceably engaged in respective radial guideways (56) in a chuck body (30), with each gripping jaw being slid into and out of one guideway when that guideway is in a preassigned jaw change position on the chuck body. The chuck jaw changer has a rotary, indexing jaw magazine (34) having holder grooves (140) defined therein at constant circumferential spacings for releasably holding additional sets of gripping jaws (32') interchangeable with the jaw set on the chuck body. A jaw transfer mechanism (36) transfers a gripping jaw (32, 32') rectilinearly between that one of the guideways (56) in the chuck body which is in the jaw change position and that one of the holder grooves in the jaw magazine which is positioned in line therewith. For accurate jaw transfer a jaw guide (38) is interposed between chuck body and jaw magazine so as to provide a substantially continuous, rectilinear jaw guide track therebetween.

28 Claims, 19 Drawing Figures

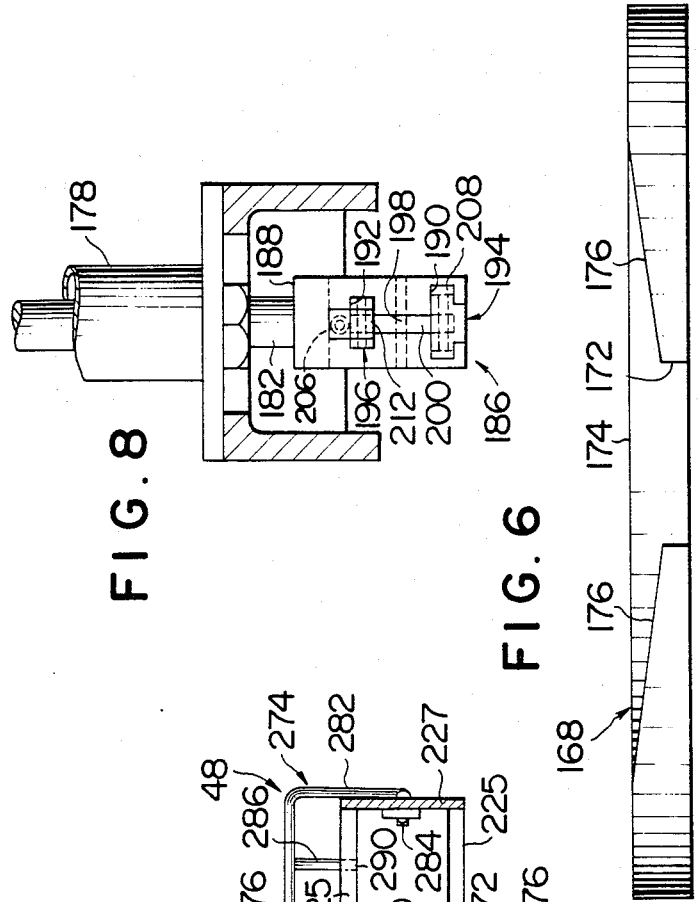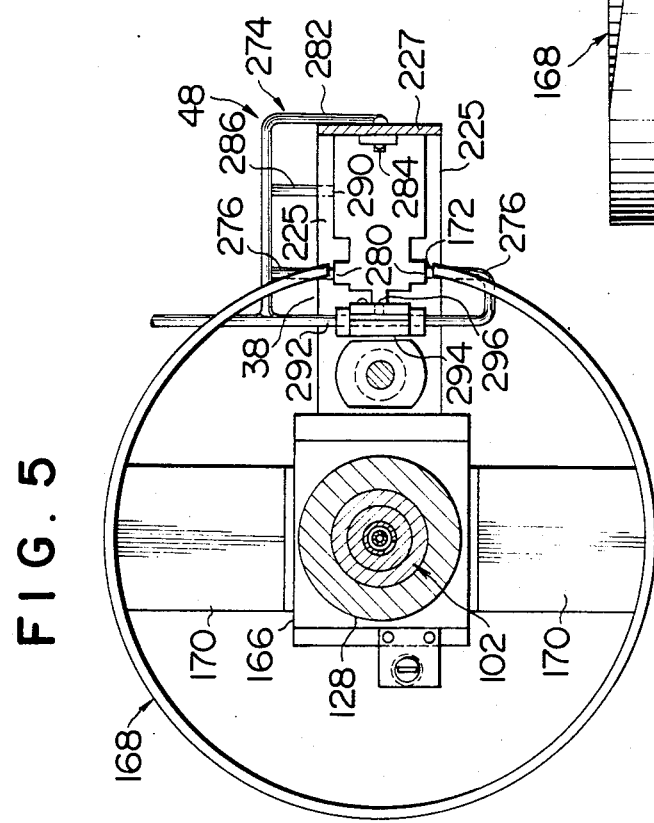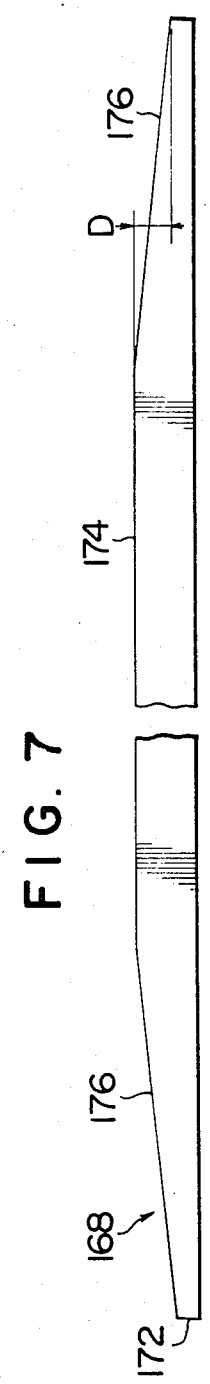

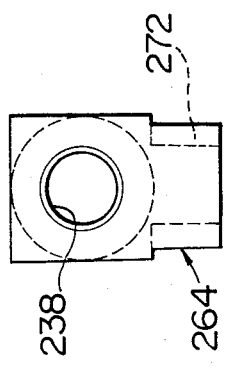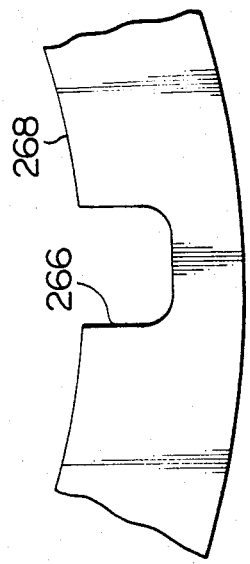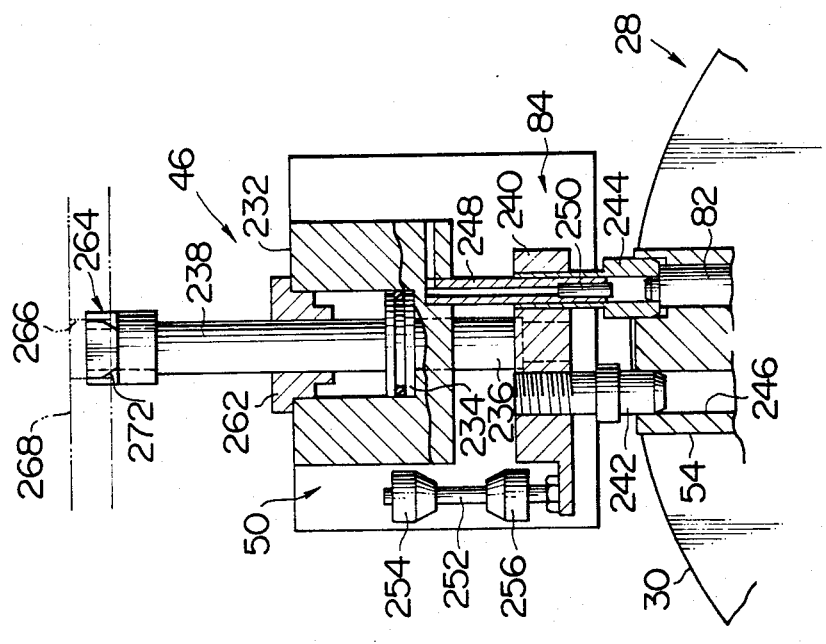

CHUCK JAW CHANGER FOR A MACHINE TOOL

BACKGROUND OF THE INVENTION

This invention relates to machine tools in general and, in particular, to lathes or like machines having a chuck with adjustable gripping jaws for holding work to be operated upon. The invention is directed more specifically to a chuck jaw changer for use on such a machine tool for automatically changing the gripping jaws of the chuck as required by the sizes of the work to be held thereby.

With the advent and dissemination of the numerical control (N/C or NC) technique, the metalworking industry has concentrated research and development efforts on the automation of all phases of machine tooling. The change of chuck jaws is no exception. A variety of devices have been suggested, some of which have been commercially accepted, for automatically changing the gripping jaws of chucks on lathes and other classes of machine tools.

A scheme common to such chuck jaw changers is the use of a jaw magazine of one type or another for holding sets of gripping jaws interchangeable with the jaw set on the chuck body. Typical conventional means for the transfer of the jaws between jaw magazine and chuck body is an arm pivoted medially similar to that of the familiar tool changer. The jaw transfer arm has a pair of gripping devices on its opposite ends for gripping the jaws on the jaw magazine and the chuck body and for changing them by the pivotal motion of the arm.

This and other comparable prior art chuck jaw changers have several drawbacks, however. One is that the jaw magazine and other associated parts must be machined to very stringent dimensional tolerances, and the magazine must be capable of indexing the jaws to the highest possible degree of accuracy for the proper transfer and positioning of the jaws on the jaw magazine and the chuck body. This of course adds considerably to the manufacturing costs of the jaw changers. The use of an additional actuator might be contemplated for exactly positioning the jaw magazine with respect to the chuck body. This alternative is also objectionable as the actuator would make the jaw changer too bulky.

The transfer of the gripping jaws between chuck body and jaw magazine by the pivotal arm is subject to the additional objection that the arm requires a large working space therebetween.

A further drawback concerns the jaw magazine itself, or its means for releasably holding the gripping jaws thereon. A typical conventional jaw magazine has any required number of undercut grooves formed at constant circumferential spacings therein for slidably receiving the T-shaped shoe portions of the gripping jaws. For preventing the gripping jaws from falling down, each undercut groove has a pair of spring energized retainer pins slidably engaged in bores in its wall so as to partly project therefrom into positive engagement with a series of teeth cut in the shoe portion of each jaw. The gripping jaws can be slid into and out of the undercut grooves by forcing the retainer pins into the walls against the effect of the springs. The retainer pins are prevented from falling out of the bores by keys embedded in the jaw magazine into sliding engagement with the retainer pins.

The above method of releasably holding gripping jaws on the jaw magazine is just about the simplest of the methods heretofore adopted to that end. The simplest known method, however, nevertheless requires the fabrication of the retainer pins and keys, the creation of the bores in the jaw magazine, and the insertion of the pins, keys and springs in the bores. Thus the manufacturing cost of the chuck jaw changer inevitably increases through an increase in the number of its component parts and in the time required for its assemblage. Further the mounting of many retainer pins, keys and springs on limited parts of the jaw magazine makes it difficult to create the undercut grooves therein at minimal angular spacings, resulting in an increase in the size of the jaw changer.

Any chuck jaw changer for installation on a machine tool should be as compact as possible to avoid interference with the operation of the machine tool itself. As machine tools have gained versatility in recent years, however, chuck jaw changers have become greater in size; indeed, some devices mounted on the headstocks of lathes occupy spaces close to the chuck or even to the tool post. Such bulky devices not only offer inconveniences to the machining operation but also are susceptible to the accumulation of chips or cuttings and to smearing with cutting oil, possibly resulting in malfunctioning or the marring of the gripping jaws or other parts.

Reduction in the size of the chuck jaw changer, however, presents no solution to the problem of chip or dust accumulation on the chuck body or on the gripping jaws thereon or on the jaw magazine. Such dirt can seriously impede the mounting of the gripping jaws on the chuck body, or may increase the resistance offered by the chuck body against the sliding motion of the jaws thereby making it impossible for the jaws to firmly grip and hold the work. This problem becomes all the more serious particularly if the chuck has toothed detents in its radial guideways for positive engagement with the toothed shoe portions of the gripping jaws. Chips caught in the teeth of the detents or in those of the jaw shoes can prevent their proper interengagement.

SUMMARY OF THE INVENTION

Such being the problems so far encountered in the art, the present invention seeks to provide a compact, reliable, and inexpensive chuck jaw changer for use on a machine tool, such that the gripping jaws can be positively transferred between, and mounted in position on, the chuck body and the jaw magazine even if the machining or indexing accuracy of the jaw magazine is not of the highest order.

The invention also seeks to reduce to a minimum the space required for jaw transfer between chuck body and jaw magazine.

The invention also seeks to make it possible to releasably hold gripping jaws on the jaw magazine by far simpler means than heretofore and hence to materially simplify and make less expensive the construction of the jaw magazine including the improved jaw holding means.

Further the invention seeks to make the chuck jaw changer retractable on the machine tool for avoiding its interference with machining operation and the collection of chips on the jaw changer.

Additionally the invention seeks to incorporate a pneumatic cleaning system with the chuck jaw changer for cleaning, by forced streams of air, at least the chuck and each new gripping jaw to be, or being, transferred to the chuck body and so to obviate the noted difficulties arising from the attachment of chips and other foreign matter to such parts.

Stated in its broadest aspect, the chuck jaw changer in accordance with the invention comprises a chuck having a chuck body mounted on the work spindle of a machine tool and a set of gripping jaws removably engaged in respective radial guideways in the chuck body. Each gripping jaw is slid into and out of one of the guideways when that guideway is in a preassigned jaw change position on the chuck body. Rotatably mounted on the machine tool is an indexing jaw magazine having a plurality of holder portions for releasably holding additional sets of gripping jaws as well as the set of gripping jaws withdrawn from the chuck body. The indexing jaw magazine is adapted to bring any of the holder portions, with or without a gripping jaw thereon, into line with that one of the guideways in the chuck body which is in the jaw change position. A jaw transfer mechanism rectilinearly transfers a gripping jaw between that one of the guideways in the chuck body which is in the jaw change position and that one of the holder portions of the jaw magazine which has been brought into line therewith. Positioned between chuck body and jaw magazine is a jaw guide providing a substantially continuous, rectilinear guide track therebetween for the passage of a gripping jaw being transferred by the jaw transfer mechanism.

It is to be appreciated that the jaw guide positively guides the gripping jaw being transferred by the transfer mechanism between chuck body and jaw magazine. Consequently any desired gripping jaw can be accurately transferred between one of the holder portions of the jaw magazine and one of the guideways in the chuck body only if the jaw guide is machined to close tolerances and mounted in position between chuck body and jaw magazine. The jaw magazine with its many holder portions need not be machined to so close tolerances as the jaw guide, nor its indexing accuracy need be too high, affording an appreciable reduction in the manufacturing cost of the chuck jaw changer.

Further the jaw transfer mechanism moves the gripping jaws along the rectilinear guide track between chuck body and jaw magazine. This makes it possible to minimize the space required for jaw transfer between chuck body and jaw magazine and hence to correspondingly reduce the size of the complete device.

A further feature of the invention resides in a positioning mechanism for locking, during jaw change, either or both of the chuck body and the jaw magazine against displacement relative to the jaw guide. Preferably the positioning mechanism includes a fluid actuated, double ended rod cylinder formed substantially integral with the jaw guide and having its two piston rods adapted for movement into and out of positive engagement with the chuck body and the jaw magazine respectively. Further, in a preferred embodiment disclosed herein, the double ended rod cylinder serves the additional purpose of unlocking each gripping jaw from the chuck body preparatory to its transfer to the jaw magazine. Thus, as the double ended rod cylinder operates to unlock one of the gripping jaws from the chuck body, its piston rods force the chuck body and the jaw magazine into exact alignment with the jaw guide and, in consequence, with each other. No other actuator than the necessary unlocking cylinder is required for thus aligning the chuck body and the jaw magazine with each other.

In the preferred embodiment the indexing jaw magazine rotates about a vertical axis, and its holder portions take the form of undercut grooves defined at constant angular spacings in the periphery of the magazine for slidably receiving the respective gripping jaws in an upstanding attitude. The invention features a substantially annular jaw rest supported under the jaw magazine so as to allow the jaws in the undercut grooves to stand thereon. The annular jaw rest is of course much easier to fabricate and mount than the aforesaid conventional means comprised of a large number of retainer pins, keys, and springs. Further the annular jaw rest is far less likely to give rise to trouble in operation and, for the reason set forth in connection with the prior art, makes it possible to minimize the spacings between the undercut grooves in the jaw magazine for the provision of a compact, lightweight jaw changer.

According to a further feature of the invention a jaw change assembly comprising the jaw magazine, the jaw transfer mechanism and the jaw guide is made movable between working and retracted positions by longitudinal and radial transport mechanisms. As the names imply, the longitudinal transport mechanism transports the jaw change assembly in a longitudinal direction of the work spindle of the machine tool, and the radial transport mechanism in a radial direction of the work spindle. The jaw change assembly comes to the working position close to the chuck only at the time of jaw change and is held retracted during machining operation. Accordingly the mounting of the chuck jaw changer in accordance with the invention on a machine tool presents no impediment at all to the usual machine tool operation. Another advantage gained by the retraction of the jaw change assembly is that it is free from the attack of chips or oil and, therefore, from the trouble arising therefrom.

The chuck jaw changer as disclosed herein further features a pneumatic cleaning system built into the jaw change assembly. The pneumatic cleaning system has a conduit system with air outlets positioned at points of vantage for blowing away chips and other foreign matter from the pertinent parts of the chuck and the gripping jaws being changed. Being built into the jaw change assembly, the cleaning system demands no particular installation space and presents no obstruction to the operation of the machine tool. Further the air outlets of the conduit system can be arranged sufficiently close to the desired objects for effectively cleaning the same. Pneumatic cleaning affords the additional advantage of applicability to chucks and jaws of various different designs.

The above and other features and advantages of this invention and the manner of attaining them will become more apparent, and the invention itself will best be understood, from a study of the following description and appended claims, with reference had to the attached drawings showing some preferable embodiments of the invention.

BRIEF DESCRIPTION OF THE DRAWINGS

FIG. 5 is a horizontal section through the chuck jaw changer, taken along the line V—V in FIG. 2 and showing in particular the annular jaw rest underlying the jaw magazine, and the air conduit system for cleaning the chuck and the gripping jaws being changed;

FIG. 6 is an enlarged front elevation of the jaw rest;

FIG. 7 is a developed elevation, partly broken away for illustrative convenience, of the jaw rest;

FIG. 8 is an enlarged elevation in vertical section taken along the line VIII—VIII in FIG. 2 and showing in particular the hook assembly of the jaw transfer mechanism;

FIG. 11 is a view similar to FIG. 10 except that the double ended rod cylinder is shown operating to unlock a gripping jaw from the chuck body and to position or align the chuck body and jaw magazine with the jaw guide disposed therebetween;

FIG. 12 is a top plan showing, on a still more enlarged scale, the positioning pawl on one of the piston rods of the double ended rod cylinder of FIGS. 10 and 11;

FIG. 13 is an enlarged, fragmentary plan of the notched ring on the jaw magazine in the chuck jaw changer of FIGS. 1 and 2, the positioning pawl of FIG. 12 being adapted to engage in any of the notches in the ring for positioning or aligning the jaw magazine with the jaw guide and hence with the chuck body;

DETAILED DESCRIPTION OF THE INVENTION

General

Figure 1:
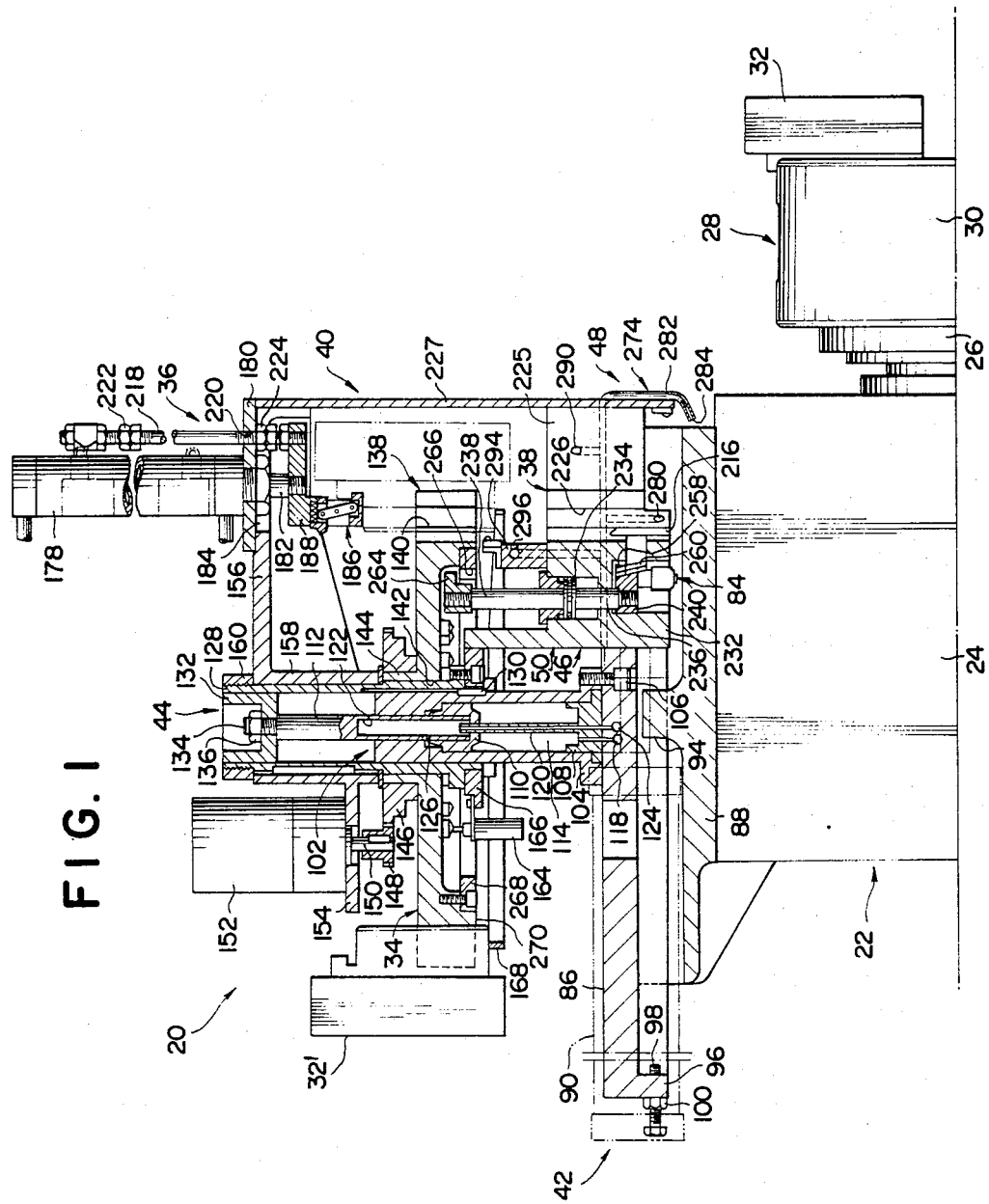
FIG. 1 is an elevation, partly a vertical section through a chuck jaw changer constructed in accordance with the principles of the invention and as mounted in position on a lathe, the view showing the jaw change assembly in a retracted position.

The chuck jaw changer in accordance with the invention is generally labeled 20 in FIGS. 1 through 4 and therein shown as structured for use with an N/C lathe 22 as an example of machine tools to which the invention is applicable. Inasmuch as the N/C lathe 22 is familiar to the machine tool specialists, only its headstock 24 and work spindle 26 projecting forwardly (rightwardly as viewed in FIGS. 1 through 3) therefrom are shown for simplicity and brevity.

Conventionally mounted on the work spindle 26 of the N/C lathe 22 is a quick change chuck 28 which may be considered a part of the chuck jaw changer 20 for the purposes of the invention. The chuck 28 comprises a chuck body 30 rigidly attached to the work spindle 26 and a set of gripping jaws 32, one seen in FIGS. 1 and 2, replaceably mounted to the chuck body. The jaw changer 20 automatically changes the jaw set 32 on the chuck body 30 with any of several other different sets of gripping jaws 32' held in stock therein.

With reference to FIGS. 1 through 4, the chuck jaw changer 20 further comprises:

1. a rotary, indexing jaw magazine 34 releasably holding the additional sets of gripping jaws 32' at constant circumferential spacings thereon;

2. a jaw transfer mechanism 36 for the rectilinear transfer of the gripping jaws 32 and 32' between chuck body 30 and jaw magazine 34; and 3. a jaw guide 38 for guiding the gripping jaw 32 or 32' being transferred by the transfer mechanism 36 between chuck body 30 and jaw magazine 34.

The above three components 34, 36 and 38, together with other components hereinafter described, make up a jaw change assembly 40 mounted on the headstock 24 of the N/C lathe 22 for movement between a retracted position of FIG. 1 and a working position of FIG. 2. The jaw change assembly 40 stays in the retracted position during the usual machining operation of the N/C lathe 22. When moved to the working position, the jaw change assembly 40 operates to change the jaw set 32 on the chuck body 30 with any desired one of the jaw sets 32' on the jaw magazine 34. Provided for such movement of the jaw change assembly 40 between the working and retracted positions are:

1. a longitudinal transport mechanism 42 for reciprocably moving the jaw change assembly 40 longitudinally of the work spindle 26 of the N/C lathe 22 and 2. a radial transport mechanism 44 for reciprocably moving the jaw change assembly 40 radially of the work spindle 26 or of the chuck 28 thereon.

In the illustrated embodiment of the invention the radial transport mechanism 44 moves the jaw change assembly 40 vertically. The word "radial" is used because the jaw change assembly 40 may not necessarily travel vertically, but only radially of the work spindle 26, depending upon the angular position of the chuck jaw changer 20 on the machine tool. The longitudinal transport mechanism 42 moves the jaw change assembly 40 between a rear position of FIG. 1, away from the chuck 28, and a front position of FIG. 2, closer to the chuck. The radial transport mechanism 44 moves the jaw change assembly 40 between an upper position of FIG. 1, radially outward of the chuck 28, and a lower position of FIG. 2, radially inward of the chuck. The jaw change assembly 40 is in the retracted position when held in the rear position by the longitudinal transport mechanism 42 and in the upper position by the radial transport mechanism 44. In its working position, on the other hand, the jaw change assembly 40 is held in the front position by the longitudinal transport mechanism 42 and in the lower position by the radial transport mechanism 44.

The chuck jaw changer 20 further features:

1. a positioning mechanism 46 closely associated with the jaw guide 38 and functioning, during jaw change, to exactly position the chuck body 30 and jaw magazine 34 with respect to each other and to the jaw guide 38 and 2. a pneumatic cleaning system 48 for removing chips and other foreign matter from pertinent parts of the chuck body 30 and the gripping jaws 32 and 32' by forced streams of air during jaw change.

Both positioning mechanism 46 and pneumatic cleaning system 48 are built into the jaw change assembly 40 for movement between the working and retracted positions. Particular attention is directed to the positioning mechanism 46, which is shown to comprise a fluid actuated, double ended rod cylinder 50. This cylinder is a multipurpose actuator performing some important functions in addition to the positioning of the chuck body 30 and jaw magazine 34 with respect to the jaw guide 38, as will become apparent as the description proceeds.

The following is a more extensive description of the chuck jaw changer 20, which for convenience will be divided under several headings.

Quick Change Chuck

Figure 2:
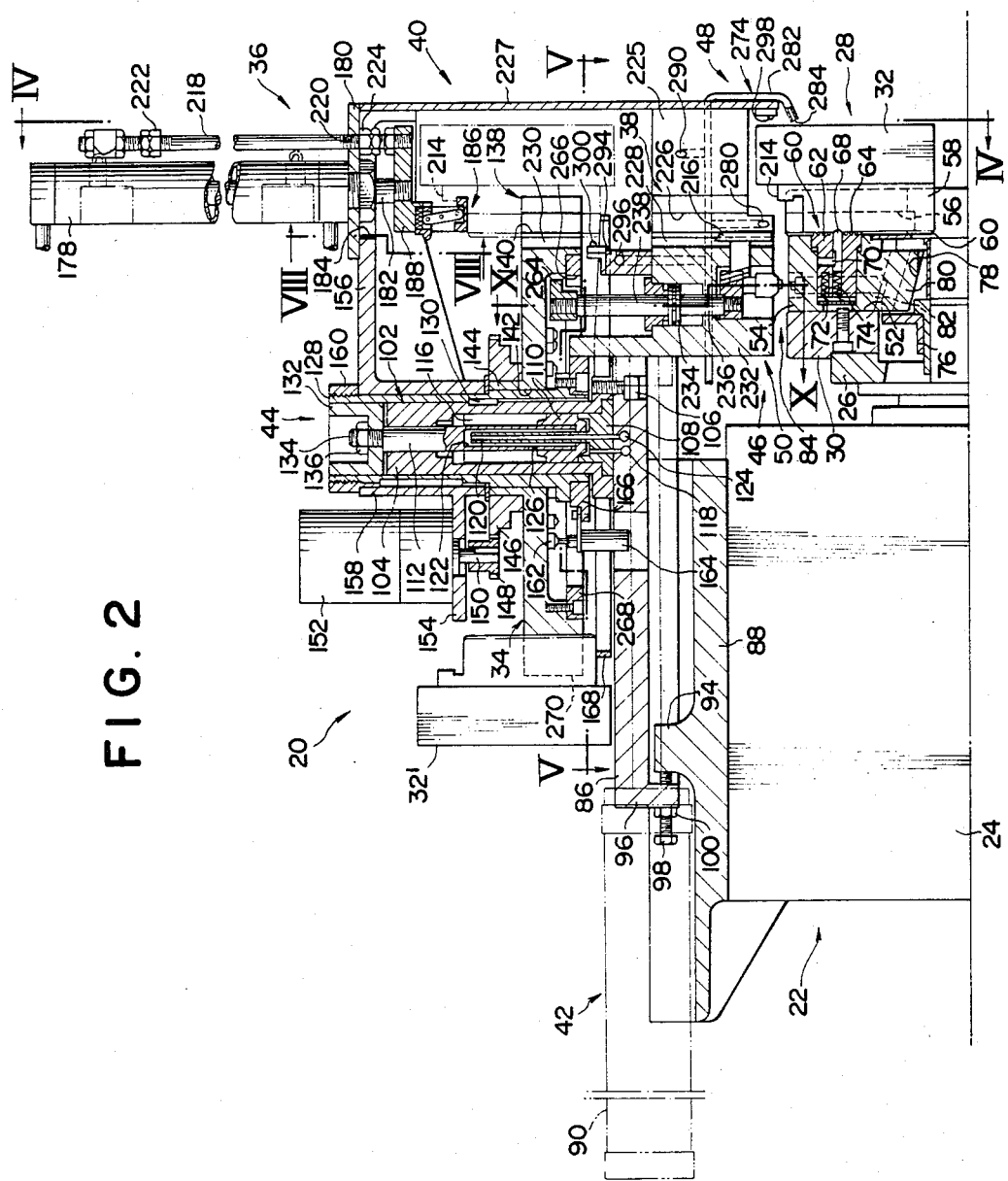
FIG. 2 is a view similar to FIG. 1 except that the jaw change assembly is shown in a working position on the lathe, the view also differing from FIG. 1 in showing the chuck sectioned to reveal its inner details.

FIG. 2 reveals the lathe chuck 28 in a radial section. As will be seen also from its front view given in FIG. 4, the particular chuck adopted here is of the type known as the three jaw universal chuck, having the three gripping jaws 32 jointly moved in and out by a wedging action, although other types of chucks could be employed as well.

Mounted on the work spindle 26 for simultaneous rotation therewith, the chuck body 30 has three radial guideways 52 formed therein at constant angular spacings for slidably receiving respective slides 54. Another three radial guideways 56 are also defined in the chuck body 30 for slidably receiving the respective T sectioned shoes 58 of the gripping jaws 32. These jaw shoes are opposed to the respective slides 54 within the chuck body 30.

A locking mechanism 60 locks each gripping jaw 32 against radial displacement relative to the opposed one of the slides 54. Each locking mechanism 60 comprises a primary detent 62 mounted in each slide 54 for sliding motion toward and away from the opposed jaw shoe 58 in a direction parallel to the work spindle 26. The primary detent 62 has a series of teeth 64 cut in its front end for positive engagement with a series of teeth 66 on the opposed surface of the jaw shoe 58. A secondary detent 68 is mounted in each primary detent 62 for sliding motion in a direction parallel to the work spindle 26. This secondary detent also has a tooth on its front end for positive engagement with the teeth 66 on the jaw shoe 58. A key 70 is embedded radially in the primary detent 62 into relatively sliding engagement in a longitudinal keyway in the secondary detent 68 for preventing its detachment from the primary detent. One or more compression springs 72 act between slide 54 and primary detent 62 to urge the latter into positive engagement with the jaw shoe 58. Another compression spring 74 acts between primary detent 62 and secondary detent 68 to urge the latter into positive engagement with the jaw shoe 58.

Accordingly, as long as the primary detent 62 is sprung into toothed engagement with the jaw shoe 58, the locking mechanism 60 remains operative to lock the gripping jaw 32 onto the opposed slide 54. When thus locked onto the slide 54, the gripping jaw 32 moves therewith along one of the radial guideways 56 relative to the chuck body 30.

Provided for the desired radial motion of the gripping jaws 32 with the slides 54, as for chucking and unchucking work, is a wedge member 76 mounted centrally in the chuck body 30 for sliding movement in its axial direction. The wedge member 76 has a plurality of, three in this embodiment, undercut grooves 78 extending at an angle to the axis of the chuck. Each slide 54 has a T sectioned wedge portion 80 slidably engaged in one undercut groove 78 in the wedge member 76. The wedge member 76 is coupled to a conventional actuating mechanism, not shown, thereby to be moved back and forth axially of the chuck 28. The bidirectional axial movement of the wedge member 76 results, of course, in the radially inward or outward movement of the slides 54 and therefore of the gripping jaws 32 along the radial guideways 56.

The gripping jaws 32 must be unlocked from the slides 54 and withdrawn out of the radial guideways 56 in the chuck body 30 for a change with some other set of jaws 32' on the jaw magazine 34. Toward this end an unlocking pin 82 is slidably mounted in each slide 54. Movable radially of the chuck, the unlocking pin 82 has an angled surface for sliding engagement with a correspondingly angled surface of the primary detent 62. The contacting angled surfaces of the primary detent 62 and unlocking pin 82 are such that upon forced depression of the unlocking pin into the slide 54, the primary detent travels rearwardly against the bias of the compression springs 72 out of engagement with the gripping jaw 32, thereby unlocking the same from the slide.

Thus disengaged from the primary detent 62, the gripping jaw 32 is nevertheless held in position on the chuck body 30 by the secondary detent 68, the latter being still in engagement with the jaw shoe 58 under the relatively light force of the compression spring 74. However, the gripping jaw 32 is movable radially of the chuck body 30 against the force of the compression spring 74 upon application of an external force.

The quick change chuck 28 of the foregoing construction rotates with the work spindle 26 under the control of the numerical control system or "director", not shown, of the N/C lathe 22. The "director" can stop the rotation of the chuck 28 in predetermined angular positions where one of the radial guideways 56 in the chuck body 30 is in what is herein called a jaw change position. Jaw change is carried out while each guideway 56 is in this jaw change position. In the illustrated embodiment of the invention, the jaw change position of the guideways 56 is vertically upward of the chuck axis as the jaw change assembly 40 is mounted on the top of the headstock 24 of the lathe 22. It is therefore apparent that the jaw change position of the guideways 56 could be in any other direction about the chuck axis depending upon the position of the jaw change assembly 40 on the machine tool.

It may be mentioned here that each unlocking pin 82 is to be activated by an unlocking mechanism 84, of which the double ended rod cylinder 50 forms a part, while the corresponding one of the guideways 56 in the chuck body 30 is in the jaw change position. More will be said about this unlocking mechanism in conjunction with the positioning mechanism 46.

Longitudinal Transport Mechanism

Figure 3:
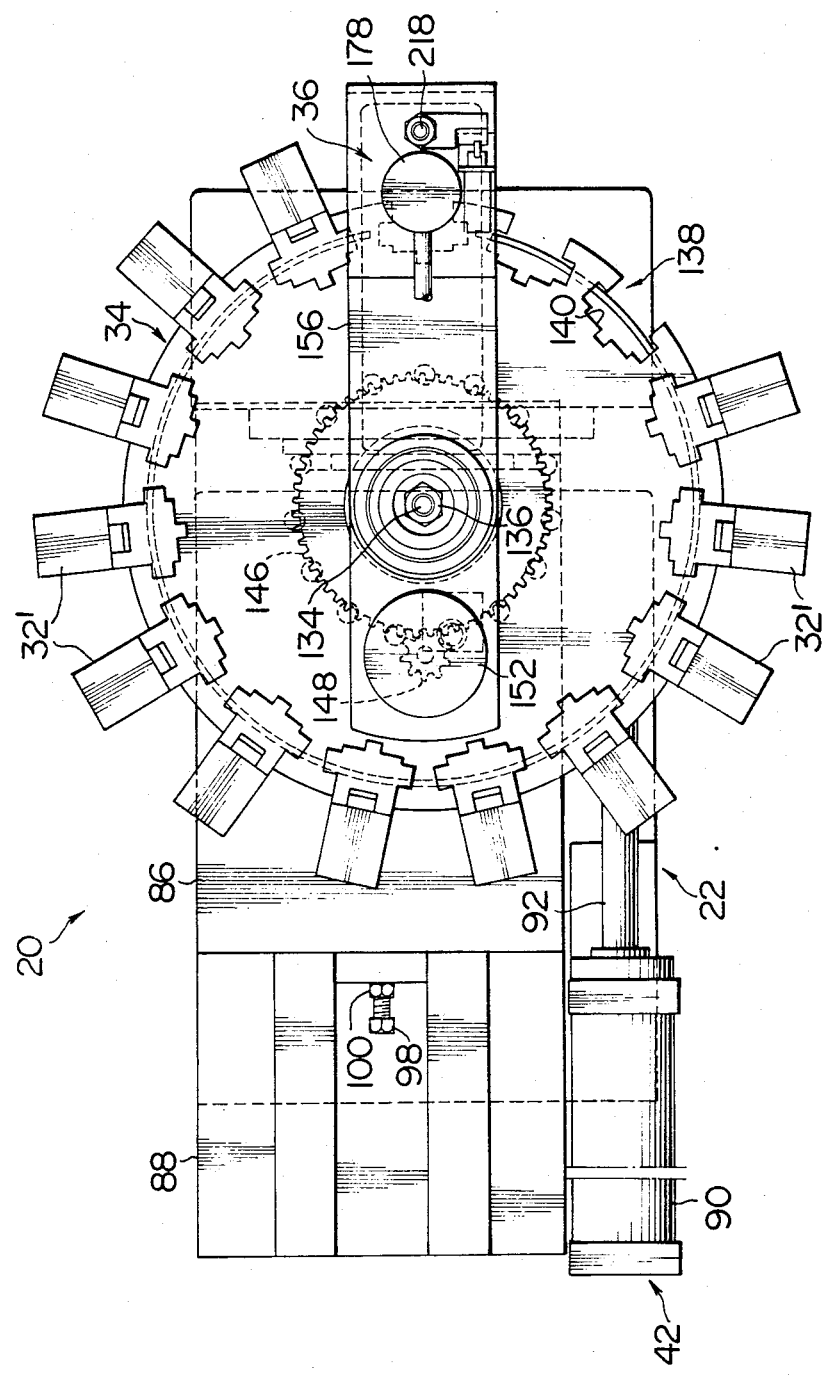
FIG. 3 is a plan of the chuck jaw changer with the jaw change assembly held in the working position as in FIG. 2.

Reference is directed to FIGS. 1, 2 and 3 for a discussion of the longitudinal transport mechanism 42 reciprocably moving the jaw change assembly 40 longitudinally of the work spindle 26. Included is a carriage 86 carrying the jaw change assembly 40 via the radial transport mechanism 44. The carriage 86 is slidably mounted on a guide 88 laid on the headstock 24 and is thereby constrained to reciprocating movement between the rear position of FIG. 1 and the front position of FIG. 2. Rigidly mounted on the headstock 22, a fluid actuated cylinder 90 has a piston rod 92 coupled to the carriage 86 to cause such travel thereof. This cylinder will be called the longitudinal cylinder hereafter by way of distinction from other cylinders to be referred to subsequently.

The guide 88 has a limit stop 94 formed integrally thereon for limiting the forward travel of the carriage 86 in the exact front position. The carriage 86 has a depending lug 96 to which there is screw threadedly fixed an adjusting bolt 98 for movement therewith into and out of abutting engagement with the limit stop 94. The adjusting bolt 98 has a locknut 100 to be secured thereby to the carriage lug 96 in a position required for stopping the carriage 86 in the exact front position.

Radial Transport Mechanism

A study of FIGS. 1 and 2 will make clear the construction of the radial transport mechanism 44 moving the jaw change assembly 40 up and down on the carriage 86. The radial transport mechanism includes a fluid actuated, double acting cylinder 102, hereinafter referred to as the radial cylinder, mounted upstandingly on the carriage 86 with its rod end oriented upwardly. The radial cylinder 102 has a cylinder body 104 having its flanged, open end held against the carriage 86 and fastened thereto as by screws 106. An end cap 108 pressure tightly closes this open end of the cylinder body 104.

Reciprocably fitted in the cylinder body 104 is a piston 110 having a piston rod 112 extending upwardly therefrom. The piston 110 defines a lower fluid chamber 114 (FIG. 1) and an upper fluid chamber 116 (FIG. 2) in the cylinder body 104. A fluid passageway 118 extends through the carriage 86 and radial cylinder end cap 108 for the delivery and discharge of a fluid, preferably hydraulic oil, to and from the lower fluid chamber 114.

For the delivery and discharge of the fluid to and from the upper fluid chamber 116, on the other hand, a pipe 120 is formed in one piece with the radial cylinder end cap 108 and extends upwardly therefrom. The pipe 120 extends through the piston 110, slidably but pressure tightly, and is received with clearance in an axial bore 122 in the piston rod 112. The bottom end of the pipe 120 opens to a fluid passageway 124 in the carriage 86, and its top end to the piston rod bore 122. The piston rod 112 has a port 126 defined radially therein for communication of its axial bore 122 with the upper fluid chamber 116.

Thus, upon alternate delivery of the fluid under pressure to the pair of opposed fluid chambers 114 and 116 of the radial cylinder 102, its piston 110 moves up and down with the piston rod 112. The jaw change assembly 40 is coupled to this piston rod 112 for up and down motion therewith, as more fully described in the following.

Slidably fitted over the radial cylinder body 104 is a hollow magazine spindle 128 which is movable up and down relative to the cylinder body but which is restrained from angular displacement by a key 130. A cap 132 is pressfitted in the top end of the magazine spindle 128. The piston rod 112 of the radial cylinder 102 has a threaded upward extension 134 of reduced diameter extending through the cap 132 and projecting upwardly therefrom. A nut 136 is fitted over this projecting end of the piston rod extension 134 to hold the cap 132, and therefore the magazine spindle 128, tightly against the piston rod 112.

It will now be apparent that the magazine spindle 128 travels up and down with the radial cylinder piston 110. The jaw magazine 34 is rotatably mounted on this magazine spindle 128, whereas the other components of the jaw change assembly 40, such as the jaw transfer mechanism 36 and jaw guide 38, are nonrotatably mounted thereon. With the vertical reciprocation of the radial cylinder piston 110, therefore, the complete jaw change assembly 40 moves between the upper position of FIG. 1 and the lower position of FIG. 2. How the magazine spindle 128 supports the listed components of the jaw change assembly 40 will become apparent as the description progresses.

Indexing Jaw Magazine

While the rotary, indexing jaw magazine 34 appears in all of FIGS. 1 through 4, FIG. 3 best illustrates that it takes the form of a turntable in this particular embodiment of the invention. The turntable-like jaw magazine 34 has a plurality of holder portions 138 at constant circumferential spacings for releasably holding the additional sets of gripping jaws 32′ as well as the set of gripping jaws 32 now shown mounted on the chuck body 30. Each holder portion 138 is shown as an undercut groove 140 (hereinafter referred to as the holder grooves) extending parallel to the axis of rotation of the jaw magazine 34 for slidably receiving the T-sectioned shoe 58 of each gripping jaw 32 or 32′.

The quick change chuck 28 has a three jaw construction, and the jaw changer 20 is intended to allow the chuck to make interchangeable use of five different sets of gripping jaws 32 and 32′. Thus the jaw magazine 34 is shown to have fifteen holder grooves 140 for these gripping jaw sets.

With reference again to FIGS. 1 and 2, the jaw magazine 34 is bored centrally at 142 and is rotatably fitted over the magazine spindle 128 which is moved up and down by the radial cylinder 102. An inspection of these figures will reveal that the jaw magazine is locked against axial displacement relative to the magazine spindle 128. Accordingly the jaw magazine 34 is both rotatable and movable vertically with respect to the carriage 86.

The jaw magazine 34 has an annular rim 144 raised from its inner edge. Fitted over this rim for joint rotation and axial displacement with the jaw magazine 34 is a driven gear 146 in mesh with a drive pinion 148 on the output shaft 150 of a motor drive unit 152 which will be referred to as the magazine motor hereafter. The magazine motor 152 is bracketed at 154 to a support frame 156 having a portion 158 encircling the magazine spindle 128. A retainer ring 160 around the top end of the magazine spindle 128 retains the support frame 156 against axial displacement relative to the magazine spindle. Consequently, as the support frame 156 travels up and down with the jaw magazine 34, so does the magazine motor 152 with the drive pinion 148, the latter thus remaining in constant mesh with the driven gear 146.

Affixed to the underside of the jaw magazine 34 in annular arrangement are a series of switch actuators 162 for the activation of an electrical switch assembly 164.

The angular positions of the switch actuators 162 on the jaw magazine 34 correspond exactly to those of the holder grooves 140 thereon. The switch assembly 164 is rigidly coupled to a mounting flange 166 on the bottom end of the magazine spindle 128.

The switch assembly 164 coacts with the series of switch actuators 162 to cause the magazine motor 152 to index the jaw magazine 34. Thus, when the rotation of the jaw magazine 34 is stopped in the working position of the jaw change assembly 40 depicted in FIG. 2, one of the holder grooves 140 therein, with or without a gripping jaw 32' received therein, comes into line with that one of the radial guideways 56 in the chuck body 30 which is in the jaw change position.

Figure 4:
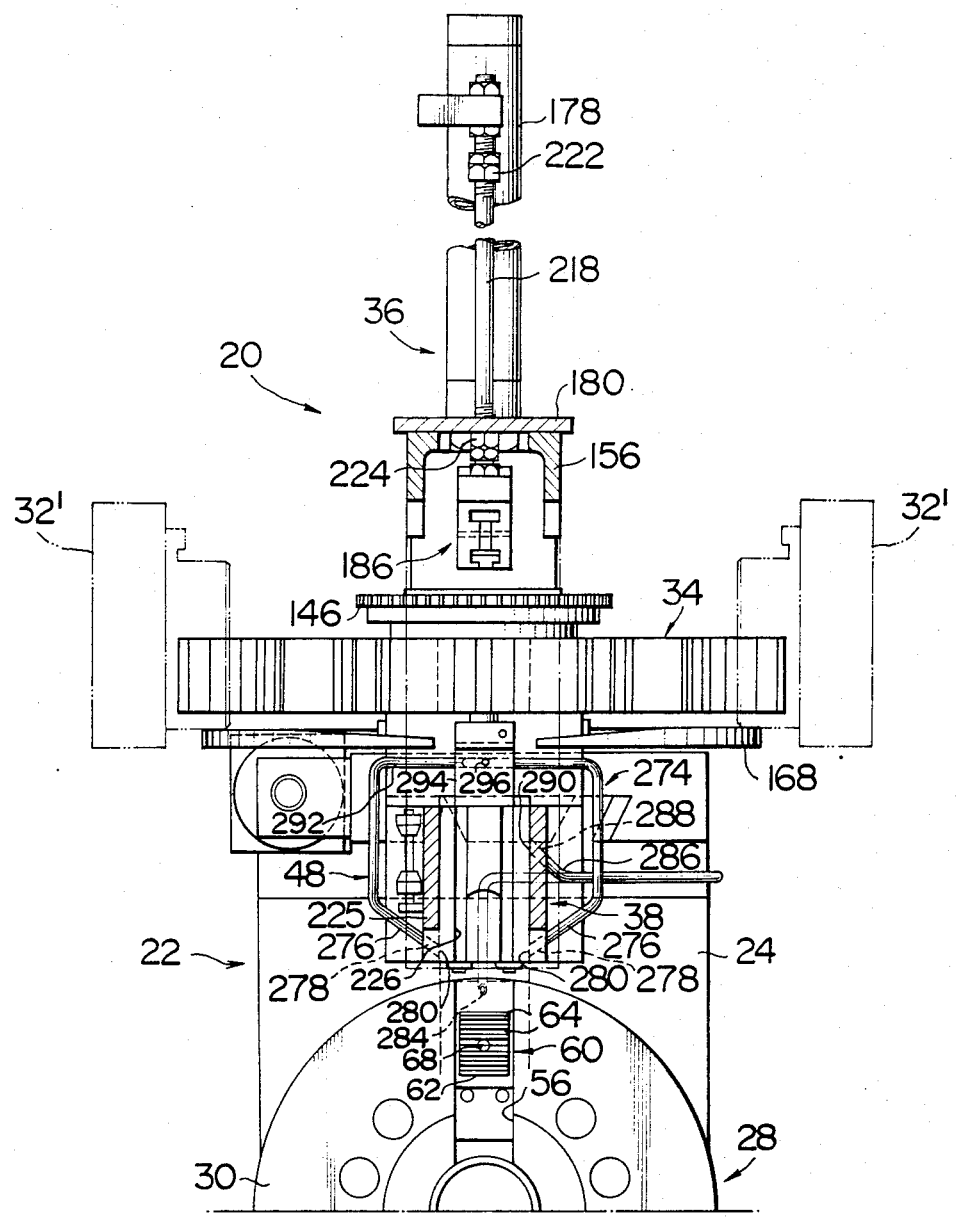
FIG. 4 is an elevation in vertical section through the chuck jaw changer, taken along the line IV—IV in FIG. 2.

At 168 in FIGS. 1, 2 and 4 is shown an annular jaw rest underlying the jaw magazine 34 for holding thereon the gripping jaws 32' slidably engaged in the holder grooves 140 in the jaw magazine. As better seen in FIG. 5, the jaw rest 168 is circular in shape and has a pair of rigid anchor plates 170 extending radially inwardly therefrom, by which the jaw rest is secured to the mounting flange 166 on the bottom end of the magazine spindle 128 slidably fitted over the radial cylinder 102. It is therefore apparent that the jaw rest 168 is movable up and down with the jaw magazine 34 but does not rotate therewith. The jaw rest 168 is partly cut away at 172 for the passage of the gripping jaws 32 or 32' as they are transferred between chuck body 30 and jaw magazine 34 when the jaw change assembly 40 is in the working position as in FIG. 2.

Preferably, and as illustrated on an enlarged scale in FIGS. 6 and 7, the top edge 174 of the jaw rest 168, slidably holding the gripping jaws 32' thereon, slopes downwardly at 176 as it extends toward the opposite extremities of the jaw rest bounding the part 172 where it is cut away. A difference D in height exists between the nonsloping part of the top edge 174 and the lowest points of the slopes 176.

A reference back to FIGS. 2 and 4 in particular will make it easier to understand the advantages gained by the jaw rest 168 of the above configuration. As the indexing jaw magazine 34 rotates in either direction to bring one of the gripping jaws 32' to the position of register with that one of the chuck body guideways 56 which is in the jaw change position, that jaw slides down one of the jaw rest slopes 176 under its own weight. When the gripping jaw 32' reaches the required position and is caught by the jaw transfer mechanism 36 in a manner yet to be described, the vertical position of the jaw is lower by the distance D than the position it occupied when it rested upon the nonsloping part of the jaw rest top edge 174. For this reason the vertical position of the jaw transfer mechanism 36 can be made lower the same distance D than that where it would have to be disposed if the top edge of the jaw rest 168 were horizontal. Chuck jaw changers in general have very narrowly confined installation spaces. The height reduction made possible by the sloping jaw rest 168, no matter how small it is, is of great significance.

Jaw Transfer Mechanism

As has been stated, the jaw transfer mechanism 36 functions to transfer the gripping jaws 32 and 32' rectilinearly between chuck body 30 and jaw magazine 34. As will be seen from FIGS. 1, 2 and 4 in particular, the jaw transfer mechanism 36 comprises a fluid actuated, double acting cylinder 178 (hereinafter referred to as the transfer cylinder) mounted uprightly on the support frame 156 via a mounting flange 180. The transfer cylinder 178 has a piston rod 182 extending downwardly therefrom through a clearance hole 184 in the support frame 156. Mounted on this piston rod 182 of the transfer cylinder is a hook assembly 186 capable of releasably engaging the gripping jaws 32 and 32' for transferring the same between chuck body 30 and jaw magazine 34 with the extension and contraction of the transfer cylinder.

Figure 9:
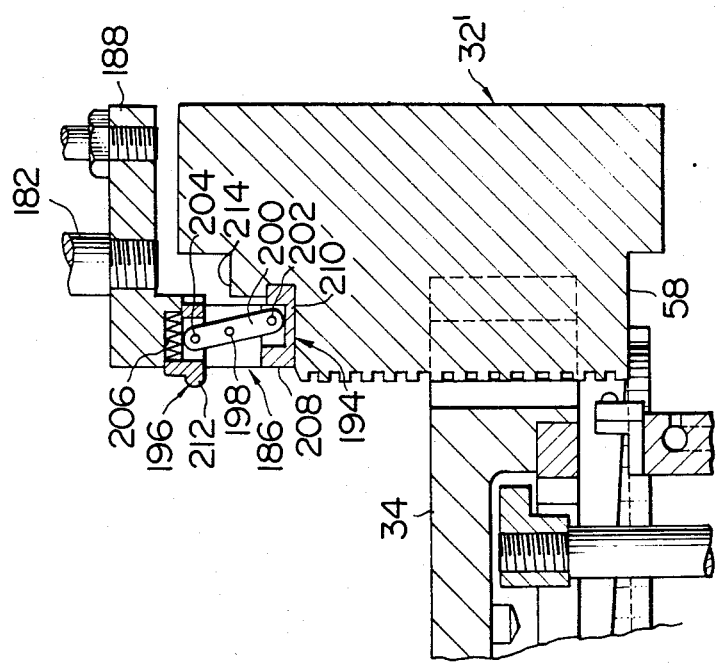
FIG. 9 is an enlarged, fragmentary elevation in vertical section through the chuck jaw changer, showing in particular one of the gripping jaws held by the jaw magazine and engaged by the hook assembly of the jaw transfer mechanism for transfer from the jaw magazine to the chuck body.

FIGS. 8 and 9 illustrate the hook assembly 186 on an enlarged scale, in rear elevation and in vertical section respectively. The hook assembly 186 includes a hook carrier 188 secured to the transfer cylinder piston rod 182. The hook carrier 188 has two vertically spaced guideways 190 and 192 formed therein, with each guideway extending parallel to the axis of the chuck 28. The lower guideway 190 has a hook 194 slidably mounted therein, whereas the upper guideway 192 has a release button 196 slidably mounted therein. Pivoted medially at 198 on the hook carrier 188 is a lever 200, the opposite ends of which are pivotally pinned at 202 and 204 to the hook 194 and release button 196. A compression spring 206 acts between hook carrier 188 and release button 196 to bias the latter rearwardly and, in consequence, to bias the hook 194 forwardly via the lever 200. The hook 194 has a rear end 208 adapted to butt against the hook carrier 188 in order to remain engaged in its guideway 190 against the bias of the compression spring 206, with the front end 210 of the hook normally projecting therefrom. The rear end 212 of the release button 196 also normally projects out of the guideway 192.

Such being the construction of the hook assembly 186, the hook 194 is normally positioned on the hook carrier 188 for engagement with an L-shaped overhang 214 formed on each gripping jaw 32 or 32' just over its shoe 58. The hook 194 moves out of engagement with the overhang 214 upon depression of the release button 196 in opposition to the force of the compression spring 206.

More specifically, when the transfer cylinder 178 is fully contracted as in FIG. 9, the hook 194 is engageable with the overhang 214 of that gripping jaw 32' on the jaw magazine 34 which has been indexed to the position of register with one of the radial guideways 56 in the chuck body 30. Upon full extension of the transfer cylinder 178, on the other hand, the hook 194 is engageable with the overhang 214 of that gripping jaw 32 on the chuck body 30 which is in the jaw change position, as will be seen upon consideration of FIG. 2.

Provided for the selective depression of the release button 196 is a retractable hook actuator 216 in the form of a short pin with a contoured head slidably mounted to the jaw guide 38. The hook actuator 216 is operatively coupled to the double ended rod cylinder 50, in a manner yet to be described, thereby to be moved in a direction parallel to the chuck axis. The hook actuator travels between a working position of FIG. 2, where it is engageable with the release button 196, and a retracted position where it is not engageable therewith.

During the extension of the transfer cylinder 178 and the consequent descent of the hook assembly 186, the hook actuator 216 lies in the working position for causing the depression of the release button 196 against the force of the compression spring 206. Thus, when the hook assembly 186 reaches the lowermost position, its hook 194 retracts into the hook carrier 188 and so becomes nonengageable with the overhang 214 of the gripping jaw in the jaw change position on the chuck body 30. Further, when the hook assembly 186 is in the lowermost position, the hook actuator 216 is retracted to allow the hook 194 to be sprung into engagement with the overhang 214 of the gripping jaw in the jaw change position on the chuck body 30. Such operation of the jaw transfer mechanism 36 will be detailed later in connection with the operation of the other components.

FIGS. 1 through 4 illustrate an upstanding rod 218 mounted on the hook carrier 188 and slidably extending upwardly through a bore 220 in the mounting flange 180 of the transfer cylinder 178. The upstanding rod 218 has a pair of stop nuts 222 and 224 threadedly mounted thereon in the vicinities of its opposite ends. The stop nuts 222 and 224 are movable into and out of abutment against the mounting flange 180 with the extension and contraction of the transfer cylinder 178, thereby serving to determine the uppermost and lowermost positions of the hook assembly 186 for proper engagement with the gripping jaws 32 and 32' on the chuck body 30 and jaw magazine 34.

Jaw Guide

One of the most pronounced features of the invention, the jaw guide 38, is formed integral with the double ended rod cylinder 50. This cylinder is mounted on the mounting flange 166 on the bottom end of the magazine spindle 128, as best shown in FIGS. 1 and 2. It is further seen from these figures and from FIG. 5 that the jaw guide 38 has a pair of forward extensions 225 anchored to a front cover 227 constituting the front end of the support frame 156. Thus, as a part of the jaw change assembly 40, the jaw guide 38 travels between the retracted position of FIG. 1 and the working position of FIG. 2.

As will be seen also from FIG. 4, the jaw guide 38 is arranged to be interposed between chuck 28 and jaw magazine 34 when the jaw change assembly 40 is in the working position. The jaw guide 38 defines an undercut guide groove 226 designed to allow the shoe 58 of each gripping jaw 32 or 32' to slide therethrough while it is being transferred between chuck body 30 and jaw magazine 34 by the jaw transfer mechanism 36. Arranged between and in line with one of the radial guideways 56 in the chuck body 30 and one of the holder grooves 140 in the jaw magazine 34, the guide groove 226 in the jaw guide 38 serves to provide a substantially continuous, rectilinear guide track for the gripping jaws 32 and 32' therebetween.

Cross-sectionally the guide groove 226 can be identical with each radial guideway 56 in the chuck body 30 and with each holder groove 140 in the jaw magazine 34. The opposite ends of the guide groove 226, however, may be flared for smooth admission of the gripping jaws 32 and 32' from the chuck body 30 and jaw magazine 34. Further, for positively guiding the gripping jaws, the guide groove 226 should have a length at least approximately equal to the length of the shoe 58 of each jaw.

The jaw guide 38 has further formed therein a small channel 228 (FIG. 2) which is open to the guide groove 226. This channel 228 is intended for the passage of the rear end 212 (FIGS. 8 and 9) of the release button 196 of the hook assembly 186. The hook actuator 216 is movable into and away from the channel 228. A similar channel 230 is likewise formed next to each holder groove 140 in the jaw magazine 34 for accommodating the rear end of the release button 196.

Positioning Mechanism

The positioning mechanism 46 includes the double acting, double ended rod cylinder 50 constituting an important feature of the invention. This cylinder performs the triple function of:

1. positioning the chuck body 30 and jaw magazine 34 with respect to the jaw guide 38;
2. acting upon each unlocking pin 82 of the chuck 28 for causing the corresponding locking mechanism 60 to unlock the corresponding gripping jaw 32 from the chuck body 30; and
3. moving the hook actuator 216 between its working and retracted positions relative to the jaw guide 38.

Thus the double ended rod cylinder 50 will be called the multipurpose cylinder hereafter.

As best seen in FIGS. 1 and 2, the multipurpose cylinder 50 has a body 232 formed integral with the jaw guide 38 and secured to the mounting flange 166 on the bottom end of the magazine spindle 128. A piston 234 reciprocably mounted in the cylinder body 232 has a first piston rod 236 oriented toward the chuck 28 when the jaw change assembly 40 is in the working position and a second piston rod 238 oriented toward the jaw magazine 34.

Figure 10:
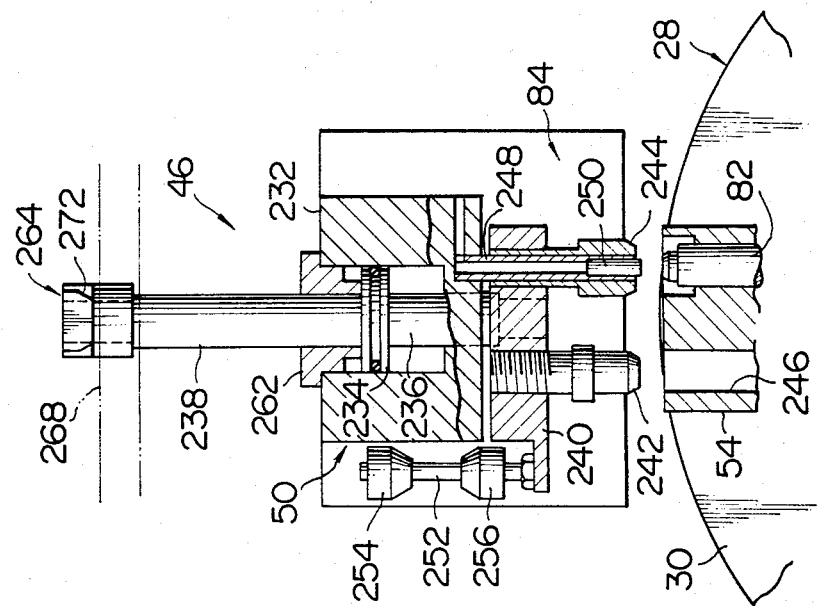
FIG. 10 is an enlarged, fragmentary elevation in vertical section through the chuck jaw changer, taken along the line X—X in FIG. 2 and showing in particular the double acting, double ended rod cylinder in its normal or inoperative state.

As illustrated on an enlarged scale in FIGS. 10 and 11, the multipurpose cylinder 50 has a pin carrier 240 secured to its first piston rod 236. Rigidly fixed to the pin carrier 240 and depending therefrom are a positioning pin 242 and a hollow push pin 244. When the jaw change assembly 40 is in the working position, the positioning pin 242 is movable into and out of a bore 246 in each slide 54, although this bore could be formed in the chuck body 30. Upon insertion of the positioning pin 242 in the bore 246 as in FIG. 11, the corresponding one of the radial guideways 56 in the chuck body 30 is held in the exact jaw change position.

The push pin 244, on the other hand, is movable into and out of abutting engagement with one of the unlocking pins 82 of the chuck 28 when the jaw change assembly 40 is in the working position. Upon descent of the multipurpose cylinder piston 234, as pictured in FIG. 11, the push pin 244 depresses the unlocking pin 82. The depression of this unlocking pin results, of course, in the retraction of the corresponding primary detent 62 (FIG. 2) out of engagement with the gripping jaw 32 lying in the jaw change position. The push pin 244 forms a part of the aforesaid unlocking mechanism 84.

FIGS. 10 and 11 also show a tubular member 248 rigidly embedded at one end in the multipurpose cylinder body 232 and slidably extending into the hollow push pin 244. The tubular member 248 serves the purpose of holding the positioning pin 242 and push pin 244 against angular displacement about the axis of the piston rod 236.

At 250 in FIGS. 10 and 11 is shown a proximity detector for sensing the fact that, upon release of each unlocking pin 82 by the push pin 244, the corresponding locking mechanism 60 (FIG. 2) has locked the gripping jaw 32 engaged in that one of the radial guideways 56 in the chuck body 30 which is in the jaw change position. Immovably engaged in the end of the tubular member 248 slidably received in the push pin 244, the proximity detector 250 is capable of detecting the opposed unlocking pin 82 when the push pin is retracted away from the chuck 28 as in FIG. 10. Upon depression of the unlocking pin 82 by the push pin 244 as in FIG. 11, the proximity detector becomes incapable of detecting the unlocking pin.

The pin carrier 240 also carries an upstanding rod 252 having a pair of switch actuators 254 and 256 in spaced apart positions thereon. These actuators are movable into and out of engagement with limit switches, not shown, affixed to the multipurpose cylinder body 232 and so function to determine the opposite extreme positions of the multipurpose cylinder 50.

The pin carrier 240 is further adapted as aforesaid to move the hook actuator 216 between its working and retracted positions relative to the jaw guide 38. To this end the pin carrier 240 has an undercut groove 258 (FIG. 1) formed therein at an angle to the axis of the multipurpose cylinder 50. The hook actuator 216 has a wedge portion 260 of corresponding shape slidably engaged in the undercut groove 258 in the pin carrier 240. Thus the up and down motion of the pin carrier 240 results in the horizontal displacement of the hook actuator 216.

With reference again to FIGS. 10 and 11 the second piston rod 238 of the multipurpose cylinder 50 slidably extends upwardly through an end cap 262 on the cylinder body 232. The second piston rod 238 terminates in a positioning pawl 264, shown on an enlarged scale in FIG. 12, bent right angularly therefrom and oriented radially outwardly of the jaw magazine 34. As will be seen also from FIGS. 1 and 2, the positioning pawl 264 is movable into and out of engagement in any of notches 266 cut at constant angular spacings in a ring 268 secured internally to the depending outer rim 270 of the jaw magazine 34. It will be understood that the notches 266 could be cut directly in the jaw magazine 34.

A comparison of FIGS. 12 and 13 will show that the positioning pawl 264 is sized to fit closely in each notch 266 in the ring 268. The positioning pawl 264 tapers downwardly at 272 for the ease of engagement in each notch 266.

Normally, or when the multipurpose cylinder piston 234 is raised as in FIG. 10, the positioning pawl 264 overlies the notched ring 268, allowing the indexing rotation of the jaw magazine 34. Upon descent of the multipurpose cylinder piston 234 as in FIG. 11, with the consequent engagement of the positioning pin 242 in the bore 246 in one of the chuck slides 54 and the depression of the associated unlocking pin 82 by the push pin 244, the positioning pawl 264 becomes received in one of the notches 266. The jaw magazine 34 is thus positioned with the desired holder groove 140 therein held exactly in line with the guide groove 226 in the jaw guide 38 and with that one of the radial guideways 56 in the chuck body 30 which is in the jaw change position.

Pneumatic Cleaning System

The pneumatic cleaning system 48 appears in FIGS. 1, 2, 4 and 5. It includes a conduit system 274 for the conveyance of air under pressure. The conduit system 274 includes a pair of conduits 276 (FIGS. 4 and 5) fitted in oblique bores 278 in the opposed side walls of the jaw guide 38. Sloping downwardly as they extend through the jaw guide walls toward each other, these conduits 276 terminate in air outlets 280 open to the guide groove 226. When the jaw change assembly 40 is in the working position as in FIG. 2, the air outlets 280 expel forced airstreams directed toward the upper end portions of the opposed side walls of that one of the radial guideways 56 in the chuck body 30 which is in the jaw change position, as will be best understood from FIG. 4.

The conduit system 274 includes another conduit 282 on the lower end of the front cover 227 of the support frame 156. The conduit 282 has an air outlet 284 oriented, when the jaw change assembly 40 is in the working position, toward the front face of that gripping jaw 32 on the chuck body 30 which is in the jaw change position. Upon withdrawal of this gripping jaw from the chuck body 30, the forced airflow from the outlet 284 falls primarily upon the teeth 64 on the primary detent 62 of the jaw locking mechanism 60 in the jaw change position.

The above air outlets 280 and 284 constitute a group of air outlets of the conduit system 274 for cleaning the quick change chuck 28. These air outlets, however, may be replaced by a single air outlet capable of blowing pressurized air against the entire chuck body guideway 56 lying in the jaw change position.

Also included in the conduit system 274 is an upwardly sloping conduit 286 fitted in a bore 288 in one of the forward extensions 225 of the jaw guide 38. This conduit 286 has a terminal air outlet 290 directed toward the work holding end of that gripping jaw 32' on the jaw magazine 34 which has been brought into line with that one of the radial guideways 56 in the chuck body 30 which is in the jaw change position. The pressurized air expelled from the conduit 286 cleans at least the work holding end of the gripping jaw 32' preparatory to its transfer to the chuck body 30 by the jaw transfer mechanism 36.

The conduit system 274 further includes a conduit 292 extending through a support 294 on the body 232 of the multipurpose cylinder 50. The conduit 292 communicates with an air outlet 296 formed in the support 294 and directed forwardly therefrom. The forced airstream from this outlet 296 impinges on the teeth 66 of the gripping jaw 32 or 32' being transferred between chuck body 30 and jaw magazine 34 through the jaw guide 38.

The above two air outlets 290 and 296 are intended to clean those parts of the gripping jaws 32 and 32' which are particularly susceptible to chips and other foreign matter. Although the provision of the air outlet 296 in the illustrated position is recommended, the work holding ends of the gripping jaws may be cleaned by forced airflow from an outlet provided on the chuck 28.

The conduit system 274 communicates with a compressor or like source of pressurized air via suitable valving, both pressurized air source and valving not being shown because of their conventional nature. The unshown valve or valves are automatically opened during jaw change, or when the jaw change assembly 40 is in the working position of FIG. 2.

FIG. 2 shows a proximity detector 298 mounted on the bottom end of the front cover 227 for sensing the gripping jaw 32 indexed to the jaw change position. Another proximity detector is disposed at 300 on the support 294 for sensing that gripping jaw 32' on the jaw magazine 34 which has been brought into line with that one of the radial guideways 56 in the chuck body 30 which is in the jaw change position.

Operation

The chuck jaw changer 20 of the above construction automatically changes the set of gripping jaws 32 shown installed on the chuck body 30 with any of the other sets of gripping jaws 32' on the jaw magazine 34 in the following manner.

It will be assumed that the N/C lathe 22 is in the state of FIG. 1, with the jaw change assembly 40 held in the retracted position. As the unshown "director" puts out a jaw change signal, as for a change in the size of work to be held by the chuck 28, the work spindle 26 comes to a stop in one of the predetermined angular positions where one of the gripping jaws 32 lies in the jaw change position as in FIG. 1. This gripping jaw 32 in the jaw change position is first withdrawn from the chuck body 30. Then the wedge member 76 of the chuck 28 is thrust forwardly for wedging all three gripping jaws 32 radially outwardly of the chuck body 30 via the slides 54 in engagement therewith to their positions for unchucking the work.

Now the jaw change assembly 40 must be moved from the retracted position of FIG. 1 to the working position of FIG. 2. To this end the longitudinal cylinder 90 is first extended to move the jaw change assembly 40 from the rear to the front position by the sliding motion of the carriage 86 along the guide 88. Then the radial cylinder 102 is contracted to move the jaw change assembly 40 from the upper to the lower position by the sliding motion of the magazine spindle 128 down the radial cylinder body 104. The extension of the longitudinal cylinder 90 and the contraction of the radial cylinder 102 are both terminated by mechanical means to bring the jaw change assembly 40 to the exact working position required.

It is assumed that the jaw magazine 34 has been turned by the magazine motor 152 to move one of its empty holder grooves 140 to the prescribed angular position thereon for the reception of the first gripping jaw 32 from the chuck 28. Accordingly, when the jaw change assembly 40 reaches the working position, that empty holder groove 140 in the jaw magazine comes into line with the first gripping jaw 32 on the chuck body 30 which is in the jaw change position. It is apparent that the jaw magazine 34 may be turned to align one of its empty holder grooves 140 with one of the radial guideways 56 in the chuck body 30 after the jaw change assembly 40 has traveled to the working position.

Further, when the jaw change assembly 40 comes to the working position, the jaw guide 38 is interposed between chuck body 30 and jaw magazine 34. The guide groove 226 in the jaw guide is aligned with one of the guideways 56 in the chuck body 30 and one of the holder grooves 140 in the jaw magazine 34, providing a substantially continuous, rectilinear guide track for the gripping jaws to be subsequently transferred therebetween.

The pneumatic cleaning system 48 starts its operation as the jaw change assembly 40 comes to the working position as described above. Receiving pressurized air from its unshown source, the conduit system 274 expels the air out of its outlets 280, 284, 290 and 296. The airstreams coming out of the outlets 280 and 284 fall, at this time, on the side and front surfaces of that gripping jaw 32 on the chuck body 30 which is in the jaw change position, blowing away chips and other dirt therefrom. The airstreams from the outlets 290 and 296 serve no useful purpose at this moment.

As desired, however, the pneumatic cleaning system 48 may be set into operation after the withdrawal of the first gripping jaw 32 from the chuck body 30. As a further alternative its conduits 276, 282, 286 and 292 may be made communicative with the pressurized air source via respective valves to be opened and closed at different moments of time.

Upon arrival of the jaw change assembly 40 at the working position the transfer cylinder 178 of the jaw transfer mechanism 36 is extended to lower the hook assembly 186 toward the chuck 28. The multipurpose cylinder 50 is in a state wherein its piston 234 is still raised, with its piston rods 236 and 238 held out of engagement with the chuck 28 and jaw magazine 34. Further, as the multipurpose cylinder piston 234 lies in the raised position, the hook actuator 216 is held projecting forwardly to its working position in the channel 228 defined by the jaw guide 38, as shown in FIG. 2 in particular.

Figure 14:
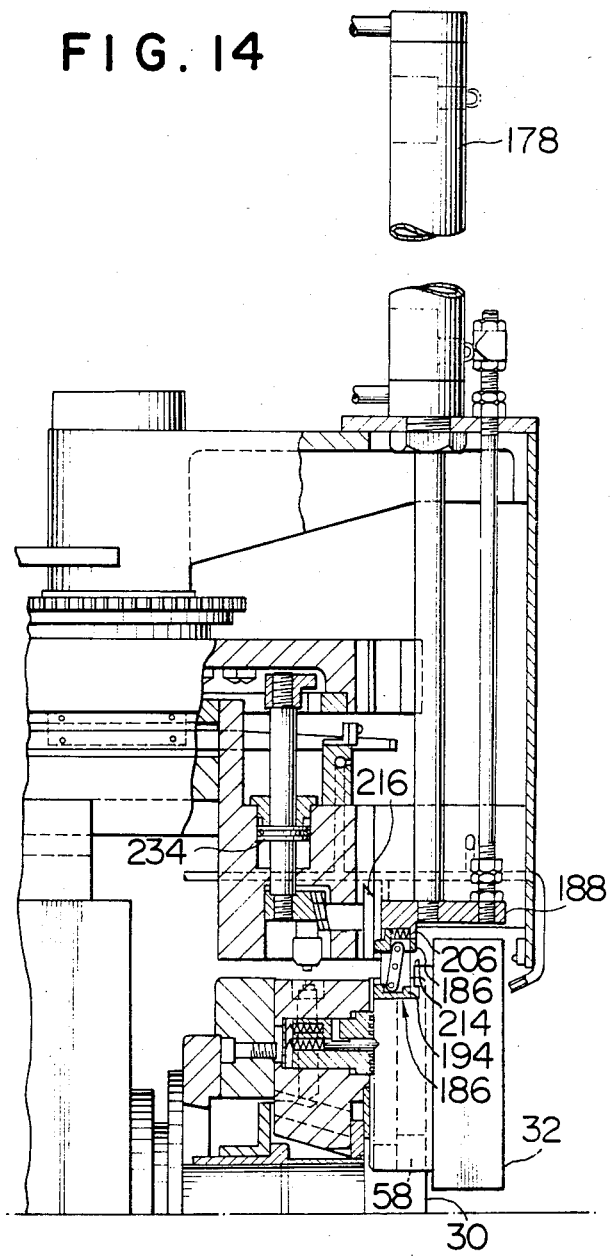
FIGS. 14, 15 and 16 are fragmentary elevations partly in vertical section, showing the chuck jaw changer of FIGS. 1 and 2 in various stages of its operation.

FIG. 14 shows the hook assembly 186 fully lowered by the transfer cylinder 178 into abutment against the shoe 58 of the gripping jaw 32 in the jaw change position on the chuck body 30. Toward the end of this descent of the hook assembly 186, its release button 196 strikes the hook actuator 216, which is being held in its working position as described above and is thereby caused to travel forwardly of the hook carrier 188 against the bias of the compression spring 206. The forward travel of the release button 196 results in the retraction of the hook 194 into the hook carrier 188, so that the hook assembly 186 can reach the lowermost position without being obstructed by the overhang 214 of the gripping jaw 32. In this lowermost position of the hook assembly 186 the hook 194 is held retracted into the hook carrier 188 as long as the multipurpose cylinder piston 234 is held raised as in FIG. 14.

Figure 15:
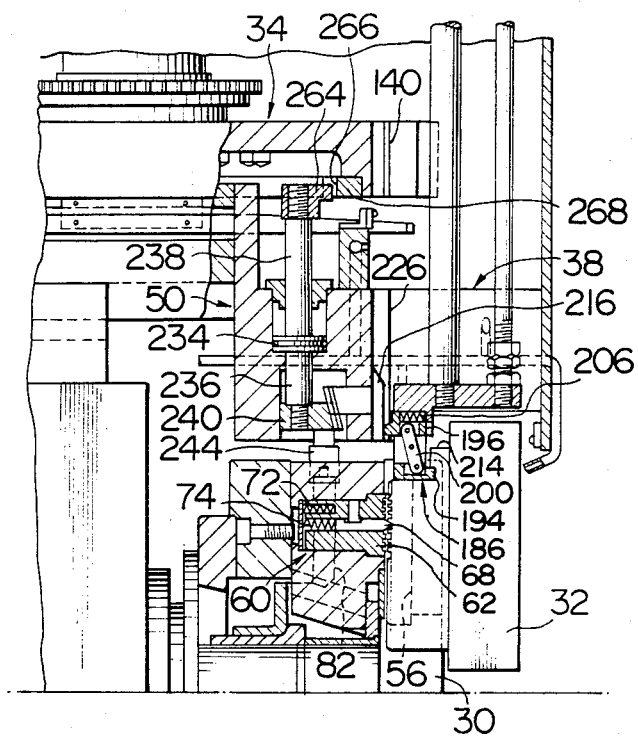

Next comes the step of lowering the multipurpose cylinder piston 234. FIG. 15 depicts the results. The pin carrier 240 on the first piston rod 236 of the multipurpose cylinder wedges the hook actuator 216 to its retracted position. Thereupon the hook 194 travels forwardly into engagement with the overhang 214 of the first gripping jaw 32 under the force of the compression spring 206 transmitted through the release button 196 and lever 200. The hook assembly 186 is now ready to carry the first gripping jaw 32 upwardly from chuck body 30 to jaw magazine 34.

The descent of the multipurpose cylinder piston 234 also results in the depression of the unlocking pin 82 of the jaw locking mechanism 60 by the push pin 244, as best pictured in FIG. 11. Upon depression of the unlocking pin 82, the primary detent 62 of the locking mechanism travels rearwardly against the bias of the compression springs 72, out of toothed engagement with the first gripping jaw 32, as in FIG. 15. The radial position of the gripping jaw 32 on the chuck body 30 remains unchanged upon disengagement of the primary detent 62 therefrom because the secondary detent 68 is still urged into engagement with its teeth 66 under the force of the compression spring 74. The force of this spring is so weak, however, that the gripping jaw can be pulled out of the radial guideway 56 in the chuck body 30 upon subsequent contraction of the transfer cylinder 178.

Furthermore, upon descent of the multipurpose cylinder piston 234, the positioning pin 242 on its first piston rod 236 is received in the bore 246 in the chuck slide 54 as in FIG. 11. Thus the chuck body 30 is positioned relative to the jaw guide 38 with the radial guideway 56 in the former exactly aligned with the guide groove 226 in the latter.

Still further, the positioning pawl 264 on the second piston rod 238 of the multipurpose cylinder 50 is received in one of the notches 266 in the ring 268 secured to the jaw magazine 34. The jaw magazine 34 is therefore also positioned with respect to the jaw guide 38 with one of its empty holder grooves 140 precisely aligned with the guide groove 226 in the jaw guide. It is thus seen that one of the radial guideways 56 in the chuck body 30, the guide groove 226 in the jaw guide 38, and one of the empty holder grooves 140 in the jaw magazine 34 have now been aligned with the highest possible degree of accuracy.

Figure 16:
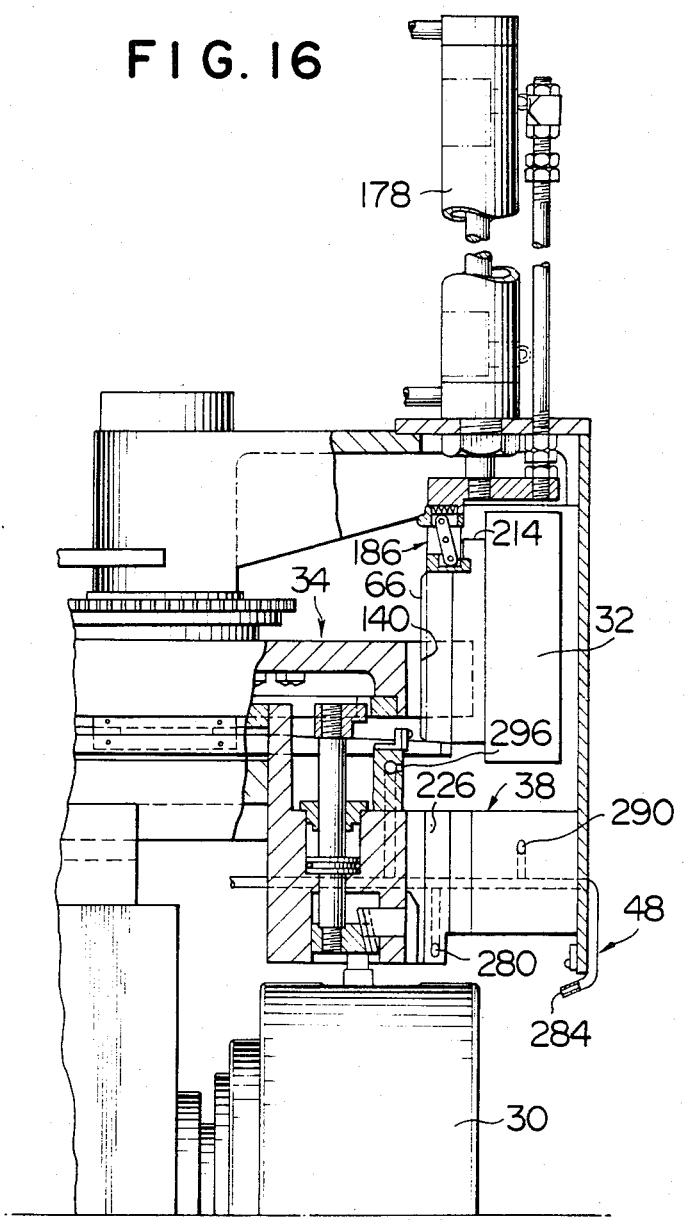

Then the transfer cylinder 178 is contracted as in FIG. 16 to raise the hook assembly 186 together with the first gripping jaw 32 engaged therewith. After being withdrawn from the radial guideway in the chuck body 30, the gripping jaw 32 travels upwardly through the guide groove 226 in the jaw guide 38 and, by being so guided, smoothly enters the holder groove 140 in the jaw magazine 34. Although received in the holder groove 140 in the state of FIG. 16, the first gripping jaw 32 must still be supported by the transfer cylinder 178 via the hook assembly 186 on its piston rod 182, because the annular jaw rest 168 is cut away under the first gripping jaw.

Upon withdrawal of the first gripping jaw 32 from the radial guideway 56 in the chuck body 30, the airstreams being expelled from the pair of opposed outlets 280 of the pneumatic cleaning system 48 strike the opposed side walls of the radial guideway thereby cleaning these guiding surfaces. The airstream from the outlet 284 falls directly upon the teeth 64 of the primary detent 62 to make them free of dirt. Positioned just in front of, and very close to, the primary detent teeth 64, the outlet 284 makes possible the application of an intense flow of pressurized air thereto for complete removal of chips and the like from the grooves between these teeth.

Further the airstream from the outlet 296 cleans the teeth 66 of the first gripping jaw 32 being transferred from chuck body 30 to jaw magazine 34. The position of this air outlet 296 is also well calculated for complete removal of solids from the grooves between the jaw teeth. Furthermore, after the jaw has been transferred to the jaw magazine 34, the airstream from the outlet 290 cleans the work holding end of the jaw.

It is particularly noteworthy in respect to the pneumatic cleaning system 48 that a total of three air outlets, the pair of opposed ones 280 and the additional one 284, are provided for cleaning each radial guideway 56 in the chuck body 30. As the airstream from the outlet 284 removes dirt from the grooves between the primary detent teeth 64, the two angled, intersecting airstreams from the pair of outlets 280 carry the dirt away from the chuck body guideway 56, thus effectively cleaning the same for the insertion of the next gripping jaw.

Then the multipurpose cylinder piston 234 is raised as in FIG. 10. The push pin 244 on the first piston rod 236 of the multipurpose cylinder 50 releases the unlocking pin 82, whereas the positioning pin 242, also on the first piston rod, withdraws from the bore 246 in the chuck slide 54. Thus released, the unlocking pin 82 allows the primary detent 62 to travel axially forwardly of the chuck 28 under the bias of the compression springs 72. The unlocking pin 82 itself is forced radially outwardly of the chuck 28 by such forward travel of the primary detent 62. This return of the unlocking pin 82 to the FIG. 10 position is sensed by the proximity detector 250, which then causes the chuck 28 to be revolved until the second gripping jaw 32 thereon comes to the jaw change position.

When the multipurpose cylinder piston 234 is raised as described above, the positioning pawl 272 thereon moves out of one of the notches 266 in the jaw magazine 34. Then the magazine motor 152 is set into rotation to revolve the jaw magazine 34 through an angle required to bring another empty holder groove 140 therein into alignment with the second gripping jaw 32 on the chuck body 30. With this revolution of the jaw magazine 34, the first gripping jaw 32 which has been transferred thereto becomes disengaged from the hook assembly 186 and rides onto either of the slopes 176 (FIGS. 6 and 7) of the top edge 174 of the jaw rest 168. Thereafter the gripping jaw slides over the jaw rest 168 with the revolution of the jaw magazine 34.

Now the chuck jaw changer 20 has returned to the state of FIG. 2. Then the second, and then the third, gripping jaws 32 are transferred from chuck body 30 to jaw magazine 34 by the repetition of the foregoing procedure.

The multipurpose cylinder piston 234 is raised following the transfer of the complete set of gripping jaws 32 from chuck body 30 to jaw magazine 34. Upon subsequent detection of the unlocking pin 82 by the proximity detector 250, the chuck body 30 is turned until its radial guideway 56, from which the first gripping jaw 32 has been withdrawn, comes to the jaw change position. The jaw magazine 34 is also turned to bring the first of the desired new set of gripping jaws 32' into line with the chuck body guideway 56 lying in the jaw change position. Although the first new gripping jaw rides off the annular jaw rest 168 when so aligned with the chuck body guideway 56, it simultaneously comes into engagement with the hook assembly 186 and is thereby prevented from slipping down the jaw magazine holder groove 140.

As has been mentioned, the pneumatic cleaning system 48 is in constant operation during jaw change. Thus the airstream from the outlet 290 of the conduit system 274 now cleans the work holding end of the first new gripping jaw 32'.

Then the multipurpose cylinder piston 234 is lowered as in FIG. 11. The push pin 244 on the first piston rod 236 of the multipurpose cylinder 50 depresses the underlying unlocking pin 82 thereby causing retraction of the corresponding primary detent 62 against the force of the compression springs 72. The positioning pin 242 is inserted in the bore 246 in the chuck slide 54 for positioning the chuck body 30 with respect to the jaw guide 38. The positioning pawl 264 on the second piston rod 238 of the multipurpose cylinder 50 is engaged in one of the notches 266 in the jaw magazine 34, so that the jaw magazine is also positioned with respect to the jaw guide 38.

Then the transfer cylinder 178 is extended to lower the first new gripping jaw 32', in engagement with the hook assembly 186 on its piston rod 182, from jaw magazine 34 to chuck body 30. Pushed out of the jaw magazine holder groove 140 by the transfer cylinder 178, the first new gripping jaw 32' slides into the jaw guide groove 226 and thence, by being guided thereby, into the chuck body guideway 56.

Attention is called to the fact that the jaw guide 38 is now rigidly coupled to both chuck body 30 and jaw magazine 34, with its guide groove 226 held precisely in line with the chuck body guideway 56 and jaw magazine holder groove 140. Accordingly, the gripping jaw can travel smoothly from jaw magazine to chuck body along the substantially continuous, rectilinear guide track offered by the jaw guide 38. This holds true, of course, even if the jaw magazine has not been machined to the closest possible tolerances and is itself incapable of bringing the gripping jaw into exact alignment with the chuck body guideway 56 in the jaw change position.

The multipurpose cylinder piston 234 is held lowered during the above transfer of the first new gripping jaw 32' from jaw magazine 34 to chuck body 30. The hook actuator 216 is therefore held retracted, allowing the hook assembly 186 to travel therepast without interfering with its release button 196. The hook 194 of the hook assembly 186 remains in engagement with the overhang 214 of the first new gripping jaw 32' until the latter becomes fully inserted in the chuck body guideway 56.

Further, during the above descent of the first new gripping jaw 32' from jaw magazine 34 to chuck body 30, the airstream from the outlet 296 recleans its teeth 66. The shoe 58 of the jaw and the chuck body guideway 56 have also been cleaned pneumatically by the time the former enters the latter, so that no foreign matter will be present to obstruct or retard the admission of the jaw shoe in the chuck body guideway.

Then the multipurpose cylinder piston 234 is raised. The positioning pin 242 and push pin 244 on the first piston rod 236 of the multipurpose cylinder 50 move out of the bore 246 in the chuck slide 54 and out of engagement with the unlocking pin 82 respectively. The positioning pawl 264 on the second piston rod 238 of the multipurpose cylinder 50 also moves out of one of the notches 266 in the jaw magazine 34.

As the push pin 244 releases the unlocking pin 82 as described above, the primary detent 62 of the jaw locking mechanism 60 will move axially forwardly of the chuck 28 into toothed engagement with the first new gripping jaw 32' in the chuck body guideway 56 under the force of the compression springs 72. Since the primary detent teeth 64 and jaw teeth 66 have both been cleaned pneumatically, they will normally interengage correctly, with the consequent movement of the unlocking pin 82 radially outwardly of the chuck 28 to the FIG. 10 position for detection by the proximity detector 250. However, should the primary detent teeth 64 and jaw teeth 66 fail to make proper interengagement by some accident, the unlocking pin 82 will not fully return to the FIG. 10 position. The proximity detector 250 will then be unable to detect the unlocking pin 82, from which fact there can be ascertained the failure of the locking mechanism 60 to lock the first new gripping jaw 32 on the chuck body 30.

The above ascent of the multipurpose cylinder piston 234 also results in the forward travel of the hook actuator 216 relative to the jaw guide 38. The hook actuator 216 pushes the release button 196 of the hook assembly 186 into the hook carrier 188 against the force of the compression spring 206. The result is the retraction of the hook 194 out of engagement with the overhang 214 of the first new gripping jaw 32'.

Then the transfer cylinder 178 is contracted to carry the unloaded hook assembly 186 back to the FIG. 2 position.

Thereafter the chuck body 30 is turned to bring to the jaw change position the radial guideway 56 from which the second old gripping jaw 32 has been withdrawn. The jaw magazine 34 is also turned by the magazine motor 152 until the second new gripping jaw 32' comes into line with the second chuck body guideway 56 in the jaw change position. The hook assembly 186 engages the second new gripping jaw 32' so positioned, keeping the same from falling down through the cut in the annular jaw rest 168.

Then the second new gripping jaw 32' is transferred to and locked in the second chuck body guideway 56 through the foregoing procedure. The third new gripping jaw 32' is likewise transferred to and locked in the third chuck body guideway 56.

Upon completion of the mounting of the desired new set of gripping jaws 32' on the chuck body 30, the piston 234 of the multipurpose cylinder 50 is raised, and the transfer cylinder 178 is contracted, both as depicted in FIG. 2. Further the jaw magazine 34 is revolved by the magazine motor 152 to bring under the raised hook assembly 186 that empty holder groove 140 therein from which the first new gripping jaw 32' has been withdrawn. This revolution of the jaw magazine 34 is intended to make it ready for the next jaw change. The unshown valve or valves of the pneumatic cleaning system 48 may now be closed to discontinue the production of airstreams from the various air outlets of the conduit system 274.

The complete jaw change assembly 40 must then be moved from the working position of FIG. 2 back to the retracted position of FIG. 1 for the resumption of machining by the N/C lathe 22 with the use of the newly installed set of gripping jaws 32'. The radial cylinder 102 is first extended to move the jaw change assembly 40 upwardly or radially outwardly of the chuck 28. Then the longitudinal cylinder 90 is contracted to cause rearward travel of the carriage 86 together with the jaw change assembly 40 mounted thereon. Thus the change of the old set of gripping jaws 32 with the new set 32' has been completed.

In the foregoing description of operation, the new set of gripping jaws 32' were transferred one after another to the chuck body 30 after the complete withdrawal of the old set of gripping jaws 32 therefrom. As will be understood, however, each new gripping jaw could be transferred to the chuck body immediately following the withdrawal of one old gripping jaw therefrom.

Second Form

Figure 17:
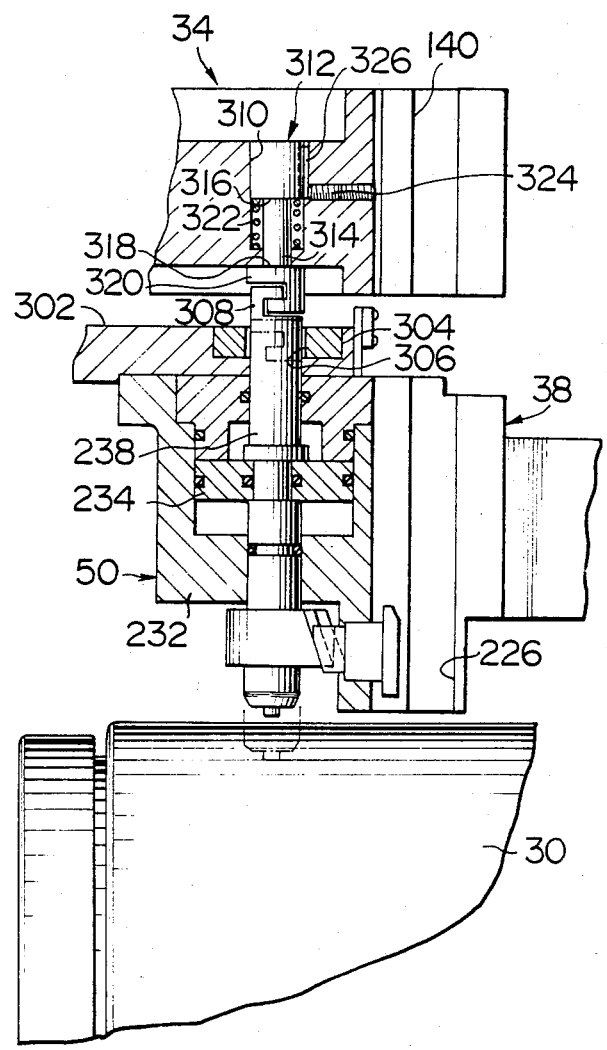
FIG. 17 is a fragmentary elevation in vertical section showing modified means for positioning the jaw magazine with respect to the jaw guide.

Shown in FIG. 17 are alternative means for positioning the jaw magazine 34 with one of its holder grooves 140 held exactly in line with the guide groove 226 in the jaw guide 38 and with one of the radial guideways, not seen in this figure, in the chuck body 30. In this alternative embodiment, the body 232 of the multipurpose cylinder 50 (having the double acting, double ended rod design as in the preceding embodiment) is secured to the underside of a mounting flange 302 which corresponds to, but is greater in radius than, the mounting flange 166 of the first described embodiment. The mounting flange 302 is of course mounted on the bottom end of the magazine spindle 128 for up and down motion therewith relative to the carriage 86.

Firmly embedded in the mounting flange 302 is a positioning ring 304 defining a positioning hole 306. The second piston rod 238 of the multipurpose cylinder 50 extends upwardly through the positioning hole 306 and terminates in an L-shaped hook 308. This hook 308 is movable into and out of the positioning hole 306 with the reciprocation of the multipurpose cylinder piston 234.

The jaw magazine 34 has formed therein a plurality of stepped bores, one seen at 310, in the same angular positions as those of the holder grooves 140 cut therein.

The stepped bores 310 extend parallel to the axis of rotation of the jaw magazine 34 and are so arranged thereon that each bore comes into exact axial alignment with the positioning hole 306 in the mounting flange 302 when the corresponding one of the holder grooves 140 is moved into line with the jaw guide groove 226.

Each stepped bore slidably receives a positioning pin 312 having a midportion 314 of reduced diameter providing a pair of opposed shoulders 316 and 318. The bottom end of the positioning pin 312, projecting downwardly of the jaw magazine 34, is shaped into a hook 320 movable into and out of engagement with the hook 308 of the multipurpose cylinder piston rod 238 with the rotation of the jaw magazine. The hooks 308 and 320 are so shaped in relation to each other than once they are interengaged as shown in FIG. 17, the multipurpose cylinder piston rod 238 and positioning pin 312 are locked against longitudinal displacement with respect to each other. Sleeved upon the reduced diameter midportion 314 of the positioning pin 312, a compression spring 322 acts between the jaw magazine 34 and the positioning pin upper shoulder 316 to urge the positioning pin upwardly. The lower shoulder 318 of the positioning pin 312 normally butts against the bottom surface of the jaw magazine 34 to limit its upward displacement. A headless screw key 324 is driven into the jaw magazine 34 for sliding engagement in a longitudinal keyway 326 in the positioning pin 312, so that the latter is held against rotation relative to the jaw magazine.

In operation the multipurpose cylinder piston 234 is held raised during the rotation of the jaw magazine 34, as is apparent from the foregoing description of the FIGS. 1 through 16 embodiment. When any of the holder grooves 140 in the jaw magazine 34 is positioned for jaw transfer to or from the chuck body 30, the hook 320 of the corresponding positioning pin 312 comes into engagement with the hook 308 of the multipurpose cylinder piston rod 238. Upon subsequent descent of the multipurpose cylinder piston 234, its piston rod 238 pulls the positioning pin 312 into the positioning hole 306 in the mounting flange 302 against the force of the compression spring 322. The jaw magazine 34 is thus positioned with respect to the jaw guide 38, with its holder groove 140 held exactly in line with the jaw guide groove 226 and, therefore, with that one of the chuck body guideways which is in the jaw change position. Of course, upon subsequent ascent of the multipurpose cylinder piston 234, the hook 308 of its piston rod 238 becomes ready to disengage from the hook 320 of the positioning pin 312 to allow the rotation of the jaw magazine 34.

Third Form

Figure 18:
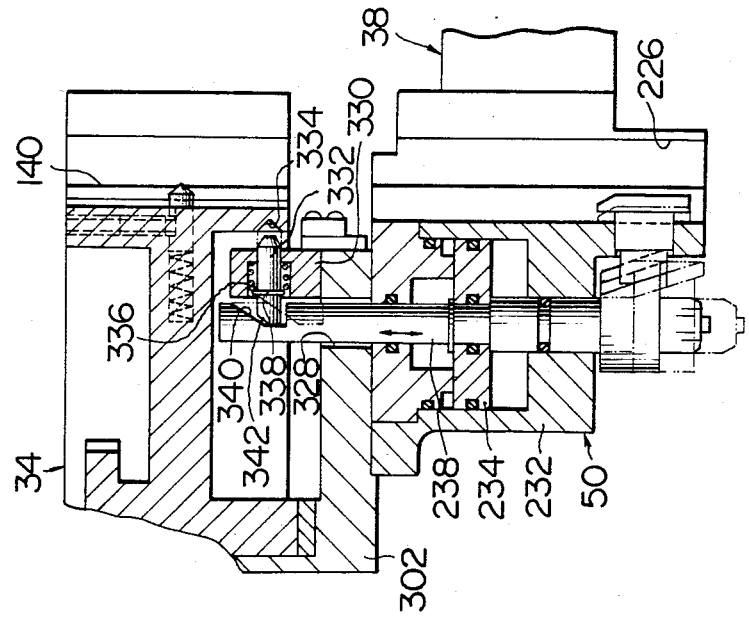
FIG. 18 is a view similar to FIG. 17 but showing another modification of the means for positioning the jaw magazine with respect to the jaw guide.

FIG. 18 shows further alternative means for positioning the jaw magazine 34 with respect to the jaw guide 38. As in the embodiment shown in FIG. 17, the body 232 of the multipurpose cylinder 50 is secured to the underside of the mounting flange 302 on the bottom end of the magazine spindle. The second piston rod 238 of the multipurpose cylinder extends upwardly through a clearance hole 328 in the mounting flange 302.

The mounting flange 302 has a lug 330 fixedly mounted in a peripheral position thereon. A positioning pin 332 is slidably mounted relative to the lug 330 for reciprocating movement in a radial direction of the jaw magazine 34. The positioning pin 332 is movable into and out of engagement in any of a series of circumferentially spaced apart recesses 334 cut in the depending outer rim of the jaw magazine 34. The angular positions of these recesses 334 on the jaw magazine 34 correspond exactly to those of the holder grooves 140 therein. A compression spring 336 acts between the lug 330 and a collar 338 on the positioning pin 332 to normally hold the latter out of engagement in the recesses 334.

The top end of the multipurpose cylinder piston rod 238, disposed radially inwardly of the positioning pin 332 with respect to the jaw guide 34, is recessed to provide a cam surface 340 for acting on a sloping rear end 342 of the positioning pin 332.

When the multipurpose cylinder piston 234 is raised as shown, the sloping rear end 342 of the positioning pin 332 is seated in the deepest part of the recessed cam surface 340 of the piston rod 238 under the influence of the compression spring 336. The jaw magazine 34 is therefore free to rotate. Upon descent of the multipurpose cylinder piston 234 following the rotation of the jaw magazine 34, the cam surface 340 of its piston rod 238 pushes the positioning pin 332 radially outwardly of the jaw magazine against the force of the compression spring 336 into engagement in one of the recesses 334. The desired one of the holder grooves 140 in the jaw magazine 34 is thus positioned in exact alignment with the jaw guide groove 226 and, as a consequence, with that one of the radial guideways in the chuck body which is in the jaw change position.

Fourth Form

Figure 19:
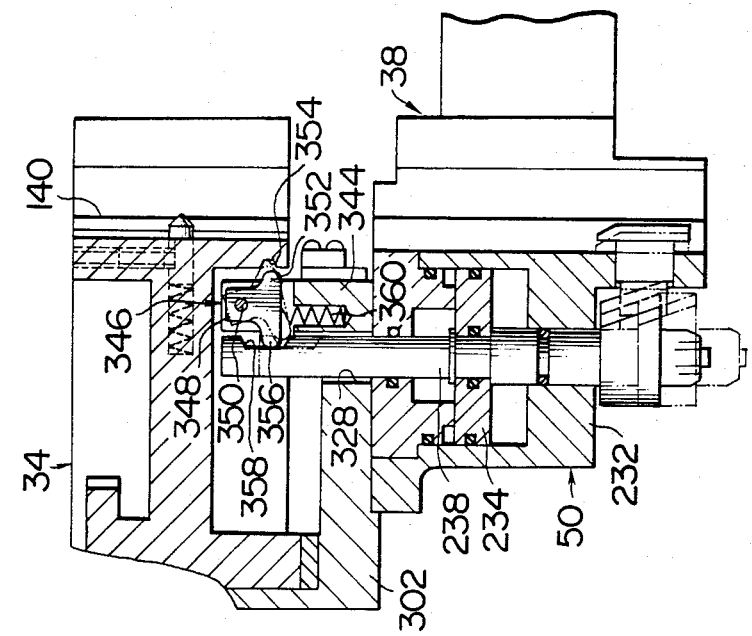
FIG. 19 is also a view similar to FIG. 17 but showing still another modification of the means for positioning the jaw magazine with respect to the jaw guide.

In FIG. 19 are shown still further alternative means for positioning the jaw magazine 34 with respect to the jaw guide 38. As in the two preceding embodiments, the body 232 of the multipurpose cylinder 50 is secured to the underside of the mounting flange 302 on the bottom end of the magazine spindle, with its second piston rod 238 extending upwardly through the clearance hole 328.

The mounting flange 302 is shown to have an integral lug 344 in a peripheral position thereon. A positioning member 346 substantially in the shape of an inverted T has a vertical limb 348 pinned at 350 to the lug 344 for pivotal motion about an axis at right angles with the radial direction of the jaw magazine 34. A first limb 352 of the two opposite horizontal limbs of the positioning member 346 is adapted for movement into and out of a series of angularly spaced apart recesses 354 in the depending outer rim of the jaw magazine 34. Like the recesses 334 of the embodiment illustrated in FIG. 18, the recesses 354 have angular positions on the jaw magazine 34 corresponding to those of the holder grooves 140 therein.

The second horizontal limb 356 of the positioning member 346 serves as a cam follower to be acted upon by a recessed cam surface 358 of the multipurpose cylinder piston rod 238. A compression spring 360 acts between the mounting flange 302 and the second horizontal limb 356 of the positioning member 346.

Thus, when the multipurpose cylinder piston 234 is held raised as in this drawing, the compression spring 360 keeps the second horizontal limb 356 of the positioning member 346 seated in the deepest part of the cam surface 358 of the multipurpose cylinder piston rod 238, thereby holding the first horizontal limb 352 out of engagement in the recesses 354 in the jaw magazine 34. Upon descent of the multipurpose cylinder piston 234, the cam surface 358 of its piston rod 238 pivots the positioning member 346 in the counterclockwise direction, as viewed in this figure, against the bias of the compression spring 360, with the result that its first horizontal limb 352 becomes engaged in one of the recesses 354 in the jaw magazine 34. Now the desired one of the holder grooves 140 in the jaw magazine 34 is correctly aligned with the jaw guide groove 226 and with that one of the radial guideways in the chuck body which is in the jaw change position.

Possible Modifications

A variety of modifications or variations of the above disclosed embodiments of the invention will occur to one skilled in the art to conform to the requirements of the intended applications of the chuck jaw changer or to design preferences, without departing from the scope of the present invention. The illustrated quick change chuck 28, in particular, represents but one of the many possible chuck constructions suitable for use with the chuck jaw changer of this invention. The following is a brief list of such possible modifications or variations of the chuck jaw changer 20 including the chuck 28:

1. Each gripping jaw 32 or 32' may be in direct toothed engagement with the corresponding chuck slide 54, instead of with the detent 62, with the slide being movable axially of the chuck for locking and unlocking the jaw as by a fluid actuated cylinder mounted on the back of the work spindle.

2. The set of gripping jaws 32 or 32' on the chuck body 30 may be locked and unlocked altogether.

3. Each gripping jaw may be unlocked by the pivotal motion, instead of linear motion as in the illustrated embodiments of the invention, of an unlocking member.

4. The turntable used as the jaw magazine 34 in the illustrated embodiment may be replaced by an endless moving means carrying jaw holders, such as that used as a tool magazine.

5. Another possible example of jaw magazine is that having jaw holders arranged radially thereon, with its axis of rotation made angularly displaceable 90 degrees.

6. A fluid actuated cylinder or solenoid may be substituted for the hook assembly 186 on the piston rod of the transfer cylinder 178, and the piston rod of the additional cylinder or the plunger of the solenoid may be adapted for movement into and out of engagement with each gripping jaw.

7. The transfer cylinder 178 may itself be replaced by a motor driven rack, with the hook assembly 186 or equivalent means mounted thereon.

8. The gripping jaws 32 and 32' may be gripped, instead of being hooked as in the illustrated embodiments, during transfer between chuck body and jaw magazine.

9. The hook assembly 186 or equivalent means may be moved between chuck body and jaw magazine by a servomotor, digital cylinder, or like means capable of accurate positional control, in order to make possible the use of chucks of various diameters or to adjustably vary the positions of engagement of the gripping jaws with the chuck slides.

10. The jaw magazine may be provided with jaw holders pivotable 180 degrees thereon so that each set of gripping jaws may hold work of two different sizes.

11. The fluid actuated cylinder 50 may not be of the double ended rod construction but may have only one piston rod for positioning either of the chuck body 30 and jaw magazine 34 with respect to the jaw guide 38.

12. In the illustrated embodiment the radial transport mechanism 44 is intended to enable the jaw change assembly 40 to bypass the headstock 24 of the N/C lathe 22 on its way between the working and retracted positions. If circumstances permit, therefore, only the longitudinal transport mechanism 42 will serve the purpose of transporting the jaw change assembly 40 between the working and retracted positions.

What is claimed is:

1. A chuck jaw changer for a machine tool having a work spindle, comprising:
   a chuck having a chuck body adapted to be mounted on the work spindle of the machine tool and having a plurality of radial guideways therein for replacably receiving a set of gripping jaws therein, each gripping jaw being slidable into and out of one of the guideways when that guideway is in a preassigned jaw change position on the chuck body;
   an indexing jaw magazine adapted to be rotatably mounted on the machine tool and having a plurality of holder portions therein for releasably holding additional sets of gripping jaws and for receiving gripping jaws withdrawn from said chuck body, said jaw magazine being indexable to a position for bringing any of the holder portions into line with the guideway in the chuck body which is in the jaw change position;
   a jaw transfer mechanism for transferring a gripping jaw rectilinearly between the guideway in the chuck body which is in the jaw change position and the holder portion of said jaw magazine which is positioned in line therewith;
   a jaw guide extending between said indexing jaw magazine and said chuck body and having a substantially continuous, rectilinear guide track thereon for guiding the gripping jaws during the transfer thereby by said jaw transfer mechanism, whereby any desired gripping jaw can be accurately transferred from the holder portions of the jaw magazine into one of the guideways in the chuck body and vice versa; and
   a transport mechanism operatively associated with said jaw magazine, jaw transfer mechanism and jaw guide for moving them relative to the machine tool between a first position away from the chuck and a second position close to the chuck in which the jaw guide is aligned between said jaw magazine and said chuck.

2. The chuck jaw changer of claim 1 wherein said transport mechanism is a mechanism for moving said jaw magazine, said jaw transfer mechanism and said jaw guide in the longitudinal direction of the work spindle of the machine tool.

3. The chuck jaw changer of claim 1 further comprising a positioning mechanism for engaging and locking the guideways in the chuck body against displacement relative to the jaw guide for holding them in the exact jaw change position.

4. The chuck jaw changer of claim 1 further comprising a positioning mechanism for engaging and locking said jaw magazine against displacement relative to the jaw guide for holding a holder portion exactly in line with the jaw guide.

5. The chuck jaw changer of claim 1 further comprising a positioning mechanism for engaging and locking said jaw magazine and said chuck body against displacement relative to said jaw guide for holding a holder portion exactly in line with the guideway in the chuck body which is held in the jaw change position and the holder portion of said jaw magazine.

6. The chuck jaw changer of claim 1 wherein said chuck has a second plurality of radial guideways in said chuck body and disposed opposite the respective gripping jaws engaged in the first recited plurality of radial guideways in the chuck body, and further comprising a plurality of slides engaged in the respective grooves of said second plurality, a locking mechanism for locking each gripping jaw against displacement relative to the opposed one of said slides, and means acting on said slides for moving the gripping jaws radially of the chuck body.

7. A chuck jaw changer for a machine tool having a work spindle, comprising:

a chuck having a chuck body adapted to be mounted on the work spindle of the machine tool and having a plurality of radial guideways therein for replacably receiving a set of gripping jaws therein, each gripping jaw being slidable into and out of one of the guideways when that guideway is in a preassigned jaw change position on the chuck body, said chuck having a second plurality of radial guideways in said chuck body and disposed opposite the respective gripping jaws engaged in the first recited plurality of radial guideways in the chuck body, and a plurality of slides engaged in the respective grooves of said second plurality, a locking mechanism for locking each gripping jaw against displacement relative to the opposed one of said slides, and means acting on said slides for moving the gripping jaws radially of the chuck body;

an indexing jaw magazine adapted to be rotatably mounted on the machine tool and having a plurality of holder portions therein for releasably holding additional sets of gripping jaws and for receiving gripping jaws withdrawn from said chuck body, said jaw magazine being indexable to a position for bringing any of the holder portions into line with the guideway in the chuck body which is in the jaw change position;

a jaw transfer mechanism for transferring a gripping jaw rectilinearly between the guideway in the chuck body which is in the jaw change position and the holder portion of said jaw magazine which is positioned in line therewith;

a jaw guide extending between said indexing jaw magazine and said chuck body and having a substantially continuous, rectilinear guide track thereon for guiding the gripping jaws during the transfer thereof by said jaw transfer mechanism, whereby any desired gripping jaw can be accurately transferred from the holder portions of the jaw magazine into one of the guideways in the chuck body and vice versa; and an unlocking mechanism for engaging the locking mechanism of the chuck which is locking the gripping jaw in the guideway in the first plurality of guideways in the chuck body which is held in the jaw change position for unlocking it.

8. The chuck jaw changer of claim 7 wherein said unlocking mechanism comprises a plurality of unlocking members, one corresponding to each locking mechanism, and each movable for causing the corresponding locking mechanism to unlock the corresponding gripping jaw, and a fluid actuated cylinder for operating the respective unlocking members.

9. The chuck jaw changer of claim 8 further comprising a detector adjacent said chuck for sensing, upon cessation of the operation of an unlocking member by said fluid actuated cylinder, the presence of the corresponding locking mechanism in a position in which it has locked the gripping jaw engaged in the guideway in the first plurality of guideways which is in said jaw change position.

10. A chuck jaw changer for a machine tool having a work spindle, comprising:

a chuck having a chuck body adapted to be mounted on the work spindle of the machine tool and having a plurality of radial guideways therein for replacably receiving a set of gripping jaws therein, each gripping jaw being slidable into and out of one of the guideways when that guideway is in a preassigned jaw change position on the chuck body, said chuck having a second plurality of radial guideways in said chuck body and disposed opposite the respective gripping jaws engaged in the first recited plurality of radial guideways in the chuck body, and a plurality of slides engaged in the respective grooves of said second plurality, a locking mechanism for locking each gripping jaw against displacement relative to the opposed one of said slides, and means acting on said slides for moving the gripping jaws radially of the chuck body;

an indexing jaw magazine adapted to be rotatably mounted on the machine tool and having a plurality of holder portions therein for releasably holding additional sets of gripping jaws and for receiving gripping jaws withdrawn from said chuck body, said jaw magazine being indexable to a position for bringing any of the holder portions into line with the guideway in the chuck body which is in the jaw change position;

a jaw transfer mechanism for transferring a gripping jaw rectilinearly between the guideway in the chuck body which is in the jaw change position and the holder portion of said jaw magazine which is positioned in line therewith;

a jaw guide extending between said indexing jaw magazine and said chuck body and having a substantially continuous, rectilinear guide track thereon for guiding the gripping jaws during the transfer thereof by said jaw transfer mechanism, whereby any desired gripping jaw can be accurately transferred from the holders portions of the jaw magazine into one of the guideways in the chuck body and vice versa;

a plurality of unlocking members in said chuck body, one corresponding to each locking mechanism and each movable for causing the corresponding locking mechanism to unlock the corresponding gripping jaw;

a fluid actuated cylinder mounted on said jaw guide and having a piston rod extending therefrom;

a push pin on said piston rod and engageable with the respective unlocking members in said chuck body; and a positioning pin on said piston rod, each slide on said chuck body having a bore therein engageable by said positioning pin for holding the respective guideways in said chuck body in an exact jaw change position with respect to said jaw guide.

11. The chuck jaw changer of claim 10 wherein the fluid actuated cylinder is a double ended rod cylinder including a second piston rod for engaging and locking said jaw magazine against displacement relative to said jaw guide with any desired one of said holder portions thereof held directly in line with that one of the first plurality of guideways in said chuck body which is in the jaw change position.

12. The chuck jaw changer of claim 11 wherein the second piston rod of the double ended rod cylinder includes jaw magazine positioning means comprising:
  a positioning pawl at the end of the second piston rod; and
  means defining a plurality of notches in angularly spaced apart positions on the jaw magazine;
  the positioning pawl being movable into and out of engagement in any of the notches with the operation of the double ended rod cylinder.

13. The chuck jaw changer of claim 11 wherein the second piston rod of the double ended rod cylinder includes jaw magazine positioning means comprising:
  a nonrotatable mounting part having formed therein a positioning hole through which extends the second piston rod of the double ended rod cylinder;
  a hook at the end of the second piston rod which is movable into and out of the positioning hole in the mounting part;
  a plurality of positioning members slidably mounted on the jaw magazine in angularly spaced apart positions thereon for movement toward and away from the double ended rod cylinder; and
  resilient means biasing each positioning member away from the double ended rod cylinder;
  the hook of the second piston rod being engageable with one of the positioning members when any of the holder portions of the jaw magazine is brought into line with that one of the first set of guideways in the chuck body which is in the jaw change position, the second piston rod subsequently pulling the engaged positioning member into the positioning hole against the bias of the resilient means.

14. The chuck jaw changer of claim 11 wherein the second piston rod of the double ended rod cylinder includes jaw magazine positioning means comprising:
  a positioning pin slidably supported by a nonrotatable part of said chuck jaw changer;
  said jaw magazine having a plurality of angularly spaced apart recesses, the positioning pin being movable into and out of engagement in any of the recesses in the jaw magazine;
  resilient means normally holding the positioning pin out of engagement with the recesses in the jaw magazine; and
  cam means on the second piston rod of the double ended rod cylinder for moving the positioning pin into engagement with one of the recesses in the jaw magazine against the force of the resilient means when any of the holder portions of the jaw magazine is brought into line with that one of the first set of guideways in the chuck body which is in the jaw change position.

15. The chuck jaw changer of claim 11 wherein the second piston rod of the double ended rod cylinder includes a jaw magazine positioning means comprising:
  a positioning member pivotally mounted on a nonrotatable part of said chuck jaw changer;
  said jaw magazine having a plurality of angularly spaced apart recesses therein, the positioning member being pivotable into and out of engagement with any of the recesses in the jaw magazine;
  resilient means normally holding the positioning member out of engagement with the recesses in the jaw magazine; and
  cam means on the second piston rod of the double ended rod cylinder for pivoting the positioning member into engagement in one of the recesses in the jaw magazine against the force of the resilient means when any of the holder portions of the jaw magazine is brought into line with that one of the first set of guideways in the chuck body which is in the jaw change position.

16. The chuck jaw changer of claim 10 wherein said jaw transfer mechanism comprises:
  a hook assembly capable of releasably engaging the gripping jaws for transferring them between said chuck body and said jaw magazine;
  means for moving the hook assembly between said chuck body and said jaw magazine; and
  a retractable hook actuator disposed on said rectilinear guide track between said chuck body and said jaw magazine for causing said hook assembly to engage and disengage a gripping jaw on said chuck body.

17. The chuck jaw changer of claim 16 wherein said hook actuator is disposed in said jaw guide.

18. The chuck jaw changer of claim 17 wherein said hook actuator is operatively coupled to the piston rod of said fluid actuated cylinder so as to be thereby moved into and out of engagement with the hook assembly.

19. The chuck jaw changer of claim 16 wherein said hook assembly comprises:
  a hook carrier coupled to said moving means to be moved between said chuck body and said jaw magazine;
  a hook mounted on said hook carrier for sliding movement between a first position for engagement with the gripping jaws and a second position for disengagement therefrom;
  resilient means on said hook carrier normally holding said hook in the first position; and
  a release button also mounted on said hook carrier and operatively coupled to said hook for moving said hook between the first and second positions, said release button moving said hook from the first to the second position against the force of said resilient means when moved into engagement with said retractable hook actuator.

20. The chuck jaw changer of claim 1 wherein the holder portions of said jaw magazine are in the form of grooves defined at spaced circumferential positions in said jaw magazine for slidably receiving the respective gripping jaws therein, and further comprising an annular jaw rest supported under said jaw magazine for holding thereon the gripping jaws received in the grooves in said jaw magazine.

21. The chuck jaw changer of claim 20 wherein said jaw rest is nonrotatable relative to the machine tool and has a cut out portion for the passage of the gripping jaws being transferred between said chuck body and said jaw magazine.

22. The chuck jaw changer of claim 21 wherein the top edge of said jaw rest slidably supporting the gripping jaws thereon, slopes downwardly as it extends toward the opposite extremities of the jaw rest bounding the cut out portion.

23. The chuck jaw changer of claim 21 wherein said jaw transfer mechanism comprises a hook assembly capable of enaging and holding the gripping jaw received in that one of the grooves in said jaw magazine which has been brought into line with that one of the guideways in said chuck body which is in the jaw change position.

24. The chuck jaw changer of claim 1 wherein said longitudinal transport mechanism comprises:
   a carriage movable on the machine tool between the first and second positions, said carriage having said jaw magazine rotatably mounted thereon and having said jaw transfer mechanism and said jaw guide nonrotatably mounted thereon; and
   an actuator coupled to said carriage for moving said carriage between the first and second positions.

25. The chuck jaw changer of claim 24 further comprising a radial transport mechanism on said carriage for jointly moving said jaw magazine and said jaw transfer mechanism and said jaw guide in a radial direction of the work spindle of the machine tool relative to said carriage, said jaw magazine and said jaw transfer mechanism and said jaw guide being moved, when said carriage is in the second position, toward the chuck for jaw changing and away from said chuck upon completion of the jaw changing.

26. The chuck jaw changer of claim 25 wherein said radial transport mechanism comprises:
   a fluid actuated cylinder on said carriage extending in the radial direction of the work spindle of the machine tool; and
   a hollow magazine spindle fitted over the cylinder and constrained to axial sliding motion relative to the same, said magazine spindle being coupled to the piston rod of said cylinder for being reciprocably moved radially of the work spindle;
   said magazine spindle having said jaw magazine rotatably mounted thereon and having said jaw transfer mechanism and said jaw guide nonrotatably mounted thereon.

27. The chuck jaw changer of claim 1 further comprising a pneumatic cleaning system for cleaning at least said chuck and the gripping jaws.

28. The chuck jaw changer of claim 27 wherein said pneumatic cleaning system comprises an air conduit system having:
   first air outlet means for expelling pressurized air directed toward said chuck;
   second air outlet means for expelling pressurized air directed toward the gripping jaw on said jaw magazine which is to be transferred to said chuck body; and
   third air outlet means for expelling pressurized air directed toward the gripping jaw being transferred between said chuck body and said jaw magazine.

* * * * *